United States Patent
Park et al.

(10) Patent No.: US 10,783,395 B2
(45) Date of Patent: Sep. 22, 2020

(54) METHOD AND APPARATUS FOR DETECTING ABNORMAL TRAFFIC BASED ON CONVOLUTIONAL AUTOENCODER

(71) Applicant: Penta Security Systems Inc., Seoul (KR)

(72) Inventors: Seung Young Park, Chuncheon-si (KR); Sang Gyoo Sim, Seoul (KR); Duk Soo Kim, Seoul (KR); Seok Woo Lee, Seoul (KR); Myung Jin Kim, Seoul (KR)

(73) Assignee: PENTA SECURITY SYSTEMS INC., Seoul (KR)

( * ) Notice: Subject to any disclaimer, the term of this patent is extended or adjusted under 35 U.S.C. 154(b) by 147 days.

(21) Appl. No.: 16/231,797

(22) Filed: Dec. 24, 2018

(65) Prior Publication Data
US 2020/0202160 A1 Jun. 25, 2020

(30) Foreign Application Priority Data
Dec. 20, 2018 (KR) .................. 10-2018-0166682

(51) Int. Cl.
| | | |
|---|---|---|
| *G06K 9/00* | (2006.01) | |
| *G06K 9/46* | (2006.01) | |
| *H04L 29/06* | (2006.01) | |
| *G06K 9/62* | (2006.01) | |
| *G06N 3/04* | (2006.01) | |
| *G06K 9/68* | (2006.01) | |

(52) U.S. Cl.
CPC .............. *G06K 9/46* (2013.01); *G06K 9/6256* (2013.01); *G06K 9/6878* (2013.01); *G06N 3/04* (2013.01); *H04L 63/1425* (2013.01); *G06K 2009/4666* (2013.01)

(58) Field of Classification Search
CPC .... G06F 17/18; G06K 9/6218; G06K 9/6267; G06N 20/00; G06N 3/08; H04L 63/1425; H04L 63/1441
See application file for complete search history.

(56) References Cited

U.S. PATENT DOCUMENTS

| | | | |
|---|---|---|---|
| 10,432,653 B2 | 10/2019 | Sim et al. | |
| 2017/0212829 A1* | 7/2017 | Bales | G06F 11/3612 |
| 2018/0285740 A1* | 10/2018 | Smyth | G06N 3/0445 |

(Continued)

FOREIGN PATENT DOCUMENTS

| | | |
|---|---|---|
| JP | 2015-82159 A | 4/2015 |
| KR | 101644998 B1 | 8/2016 |

(Continued)

OTHER PUBLICATIONS

Zhang, Xiang, and Yann LeCun. "Text understanding from scratch." arXiv preprint arXiv:1502.01710 (2015). (Year: 2015).*

(Continued)

*Primary Examiner* — Li Liu
(74) *Attorney, Agent, or Firm* — Goldilocks Zone IP Law

(57) ABSTRACT

Disclosed herein are a method and an apparatus for detecting abnormal traffic based on a convolutional autoencoder (CAE). The method of detecting abnormal traffic based on the CAE may include converting a character string of normal traffic into an image, learning the converted image using the CAE, and detecting abnormal traffic by inputting target traffic to the learned CAE.

18 Claims, 15 Drawing Sheets

(56) References Cited

U.S. PATENT DOCUMENTS

| | | | |
|---|---|---|---|
| 2020/0027000 A1* | 1/2020 | Pai | G06N 3/08 |
| 2020/0059451 A1* | 2/2020 | Huang | H04L 61/1511 |
| 2020/0117887 A1* | 4/2020 | Chaudhuri | G10L 25/24 |

FOREIGN PATENT DOCUMENTS

| | | |
|---|---|---|
| KR | 10-1888683 B1 | 8/2018 |
| KR | 101888683 B1 | 8/2018 |

OTHER PUBLICATIONS

Kwon, Donghwoon, et al. "A survey of deep learning-based network anomaly detection." Cluster Computing (2017): 1-13. (Year: 2017).*

Yadav, Satyajit, and Selvakumar Subramanian. "Detection of Application Layer DDoS attack by feature learning using Stacked AutoEncoder." 2016 International Conference on Computational Techniques in Information and Communication Technologies (ICCTICT). IEEE, 2016. (Year: 2016).*

Zolotukhin, Mikhail, et al. "Analysis of http requests for anomaly detection of web attacks." 2014 IEEE 12th International Conference on Dependable, Autonomic and Secure Computing. IEEE, 2014. (Year: 2014).*

Estévez-Tapiador, Juan M., Pedro Garcia-Teodoro, and Jesús E. Diaz-Verdejo. "Measuring normality in HTTP traffic for anomaly-based intrusion detection." Computer Networks 45.2 (2004): 175-193. (Year: 2004).*

Garcia-Teodoro, Pedro, et al. "Anomaly-based network intrusion detection: Techniques, systems and challenges." computers & security 28.1-2 (2009): 18-28. (Year: 2009).*

Xiang Zhang et al., Character-level Convolutional Networks for Text Classification, Text Understanding from Scratch as posted at https://arxiv.org/pdf/1502.01710 on Apr. 4, 2016, pp. 1-9.

Christian Szegedy et al., Inception-v4, Inception-ResNet and the Impact of Residual Connections on Learning, arXiv:1602.07261v2 [cs.CV], posted on Aug. 23, 2016, pp. 1-12.

Hyeonwoo Noh et al., Learning Deconvolution Network for Semantic Segmentation, arXiv:1505.04366v1 [cs.CV]May 17, 2015, pp. 1-10.

Antonia Creswella et al., On denoising autoencoders trained to minimise binary cross-entropy, Oct. 10, 2017, https://arxiv.org/pdf/1708.08487.pdf, arxiv.org.

Analyzing of electrocardiogram in neural network, Interface, Jun. 2018, pp. 117-125, Tokyo, Japan.

Fujita et al., Binary Cross-Entropy, Deep Learning, Nov. 30, 2016, Tokyo, Japan.

* cited by examiner

METHOD AND APPARATUS FOR DETECTING ABNORMAL TRAFFIC BASED ON CONVOLUTIONAL AUTOENCODER

CLAIM FOR PRIORITY

This application claims priority to Korean Patent Application No. 2018-0166682 filed on Dec. 20, 2018 in the Korean Intellectual Property Office (KIPO), the entire contents of which are hereby incorporated by reference.

BACKGROUND

1. Technical Field

Example embodiments of the present invention relate in general to the field of detecting abnormal traffic based on a convolutional autoencoder (CAE) and more specifically to a method and an apparatus for detecting abnormal traffic by learning normal traffic using a CAE and inputting target test traffic to the learned CAE.

2. Related Art

Recently, with the widespread use of high-speed communication including mobile communication, communication traffic based on a hypertext transfer protocol (HTTP) between a server and the Internet is rapidly increasing. Here, HTTP is a communication protocol used for exchanging hypertext documents. Hypertext refers to a method of allowing documents, even different documents, to appear as a single document and to be easily referred to by intervening specific keywords in the documents to combine and link characters or pictures.

HTTP-based communication traffic includes not only that used by an ordinary user but also abnormal traffic which is massively caused by an attacker having malicious purpose. Such abnormal traffic causes serious inconvenience to ordinary users, such as a server connection delay or a server access failure, and thus efforts to detect abnormal traffic continue.

A conventional means for detecting abnormal traffic generally monitors a quantitative change such as the number of packets or sizes thereof and detects abnormal traffic when an abrupt change occurs. However, the abnormal traffic is not necessarily distinguished by the number of packets or sizes thereof such that there is a problem in that normal traffic is erroneously detected as the abnormal traffic.

Recently, studies on image recognition technology using a convolutional neural network (CNN) have been carried out, and thus various network structures for improving image recognition performance have been proposed. However, conventional CNN-based image recognition technologies perform learning by receiving images as input data such that there is a problem in that the conventional CNN-based image recognition technologies are not suitable for detecting whether traffic is normal or abnormal.

Accordingly, there is a need for a method capable of detecting abnormal traffic by analyzing traffic based on an artificial neural network instead of a conventional traffic analysis method.

SUMMARY

Accordingly, example embodiments of the present invention are provided to substantially obviate one or more problems due to limitations and disadvantages of the related art.

Example embodiments of the present invention provide a method of detecting abnormal traffic based on a convolutional autoencoder (CAE).

Example embodiments of the present invention also provide an apparatus for detecting abnormal traffic based on a CAE.

One aspect of the present invention is to provide a method of detecting abnormal traffic based on a CAE.

In some example embodiments, a method of detecting abnormal traffic based on a CAE includes converting a character string of normal traffic into an image, learning the converted image using the CAE, and detecting abnormal traffic by inputting target traffic to the learned CAE.

The detecting of the abnormal traffic includes converting the target traffic into an image and evaluating binary cross entropy (BCE) or binary cross varentropy (BCV) on an output obtained by inputting the target traffic converted into the image into the learned CAE.

The converting of the character string into the image may include obtaining the normal traffic in the form of unicode transformation format (UTF)-8 and converting the obtained character string of the normal traffic into a hexadecimal number.

The converting of the character string into the image may include converting the character string of the normal traffic in a reverse order, converting characters constituting the character string converted in the reverse order into vectors, and converting the vector-converted character string into an image.

The CAE may be an autoencoder constituted based on Inception-ResNet-V2.

The learning of the converted image using the CAE may include determining parameters of the CAE so as to minimize a cost function defined based on the BCE.

When the number of channels is K and a length of a sequence is L, the BCE may be defined as the following Equation with respect to a target traffic $x_{kl}^{(n)}$ converted into the image and an output $\hat{x}_{kl}^{(n)}$:

$$BCE_n = -\frac{1}{KL}\sum_{k=0}^{K-1}\sum_{l=0}^{L-1}\left(x_{kl}^{(n)}\log\hat{x}_{kl}^{(n)} + (1-x_{kl}^{(n)})\log(1-\hat{x}_{kl}^{(n)})\right).$$

When the number of channels is K and a length of a sequence is L, the BCV is defined as the following equation with respect to the target traffic $x_{kl}^{(n)}$ converted into the image and an output $\hat{x}_{kl}^{(n)}$:

$$BCV_n = \frac{1}{KL}\sum_{k=0}^{K-1}\sum_{l=0}^{L-1}\left(-x_{kl}^{(n)}\log\hat{x}_{kl}^{(n)} - (1-x_{kl}^{(n)})\log(1-\hat{x}_{kl}^{(n)}) - BCE_n\right)^2.$$

The learning of the converted image using the CAE may include determining parameters of the CAE to minimize the cost function defined by linearly combining total BCE according to the BCE with total BCV according to the BCV.

The cost function is defined as the following equation:

Cost function=$\beta \cdot$totalBCE+$\alpha \cdot$totalBCV

Another aspect of the present invention is to provide an apparatus for detecting abnormal traffic based on a CAE.

In other example embodiments, an apparatus for detecting abnormal traffic based on a convolutional autoencoder (CAE) includes at least one processor and includes a memory configured to store instructions which direct the at least one processor to perform at least one operation.

The at least one operation may include converting a character string of normal traffic into an image, learning the converted image using the CAE, and detecting abnormal traffic by inputting target traffic to the learned CAE.

The detecting of the abnormal traffic may include converting the target traffic into an image and evaluating binary cross entropy (BCE) or binary cross varentropy (BCV) on an output obtained by inputting the target traffic converted into the image into the learned CAE.

The converting of the character string into the image may include obtaining the normal traffic in the form of unicode transformation format (UTF)-8 and converting the obtained character string of the normal traffic into a hexadecimal number.

The converting of the character string into the image may include converting the character string of the normal traffic in a reverse order, converting characters constituting the character string converted in the reverse order into vectors, and converting the vector-converted character string into an image.

The CAE may be an autoencoder constituted based on Inception-ResNet-V2.

The learning of the converted image using the CAE may include determining parameters of the CAE so as to minimize a cost function defined based on the BCE.

When the number of channels is K and a length of a sequence is L, the BCE may be defined as the following Equation with respect to a target traffic $x_{kl}^{(n)}$ converted into the image and an output $\hat{x}_{kl}^{(n)}$:

$$BCE_n = -\frac{1}{KL}\sum_{k=0}^{K-1}\sum_{l=0}^{L-1}\left(x_{kl}^{(n)}\log\hat{x}_{kl}^{(n)} + (1-x_{kl}^{(n)})\log(1-\hat{x}_{kl}^{(n)})\right).$$

When the number of channels is K and a length of a sequence is L, the BCV may be defined as the following equation with respect to the target traffic $x_{kl}^{(n)}$ converted into the image and an output $\hat{x}_{kl}^{(n)}$:

$$BCV_n = \frac{1}{KL}\sum_{k=0}^{K-1}\sum_{l=0}^{L-1}\left(-x_{kl}^{(n)}\log\hat{x}_{kl}^{(n)} - (1-x_{kl}^{(n)})\log(1-\hat{x}_{kl}^{(n)}) - BCE_n\right)^2.$$

The learning of the converted image using the CAE may include determining parameters of the CAE to minimize the cost function defined by linearly combining total BCE according to the BCE with total BCV according to the BCV.

The cost function may be defined as the following equation:

Cost function=β·totalBCE+α·totalBCV

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
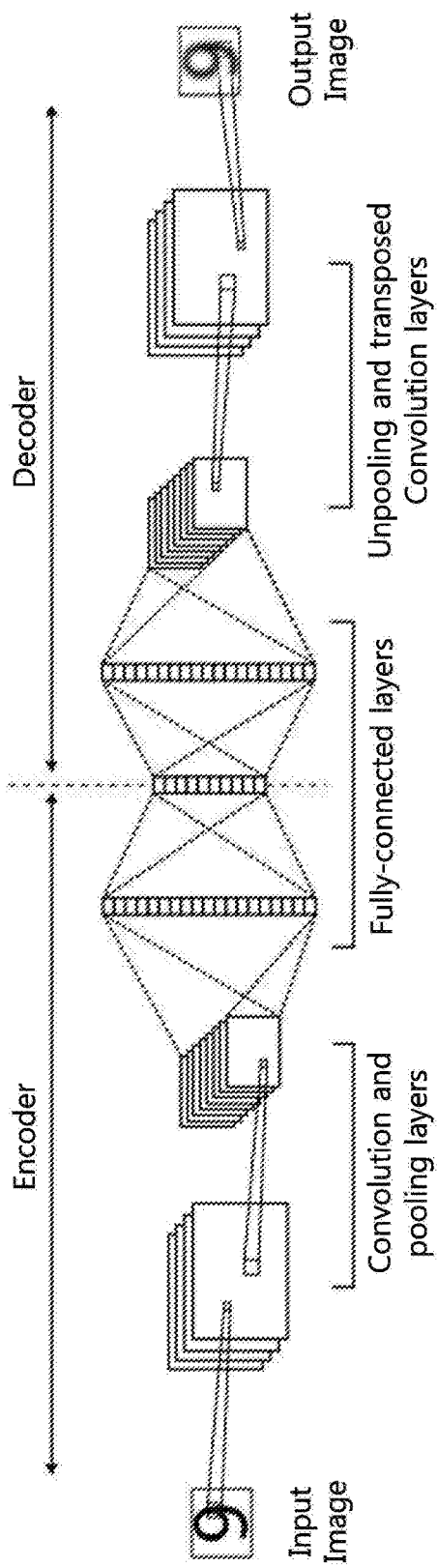
FIG. 1 is an exemplary diagram for describing a concept of a method and an apparatus for detecting abnormal traffic based on a convolutional autoencoder (CAE) according to one embodiment of the present invention.

The present invention may be modified into various forms and may have a variety of example embodiments, and, therefore, specific embodiments will be illustrated in the drawings and described in detail. The example embodiments, however, are not to be taken in a sense which limits the present invention to the specific embodiments and should be construed to include modifications, equivalents, or substitutes within the spirit and technical scope of the present invention. In describing each drawing, a similar reference numeral is assigned to a similar component.

Although the terms "first," "second," "A," "B," and the like may be used herein to describe various components, these components should not be limited to these terms. The terms are used only for the purpose of distinguishing one component from another component. For example, without departing from the scope of the present invention, a first component may be referred to as a second component, and similarly, a second component may also be referred to as a first component. The term "and/or" includes a combination of a plurality of related listed items and any one item of the plurality of related listed items.

When a component is referred to as being "connected," or "coupled" to another component, it may be directly connected or coupled to another component, but it should be understood that yet another component may exist between the component and another component. On the contrary, when a component is referred to as being "directly connected," or "directly coupled" to another, it should be understood that yet another component may be absent between the component and another component.

The terms used herein are employed to describe only specific embodiments and are not intended to limit the present invention. Unless the context clearly dictates otherwise, the singular form includes the plural form. It should be understood that the terms "comprise," "include," and "have" specify the presence of stated herein features, numbers, steps, operations, components, elements, or combinations thereof but do not preclude the presence or possibility of adding one or more other features, numbers, steps, operations, components, elements, or combinations thereof.

Unless otherwise defined, all terms including technical or scientific terms used herein have the same meaning as commonly understood by those skilled in the art to which the present invention pertains. General terms that are defined in a dictionary shall be construed as having meanings that are consistent in the context of the relevant art and are not to be interpreted as having an idealistic or excessively formalistic meaning unless clearly defined in the present application.

Generally, traffic may refer to web traffic representing an amount of data for which a person visiting a web site transmits or receive or may refer to Internet traffic representing a flow of data via the Internet. Further, the traffic may refer to Internet traffic using a hypertext transfer protocol (HTTP). Here, the HTTP may be a stateless protocol, and the stateless protocol may not request an HTTP server to hold information or a status for each user during a multiple request period.

Further, an HTTP session may refer to a transaction of a series of network requests and responses. For example, an HTTP client may initiate a request by establishing a transmission control protocol (TCP) connection to a specific port on a HTTP server, the HTTP server listening on the specific port may wait for a request message from the HTTP client, and, when receiving the request message, the HTTP server may transmit a status indicating string such as "HTTP/1.1 200 OK" and a selfsame message. A body of the selfsame message may generally be a requested resource, but an error message or other information may be returned. Here, the request message of the HTTP client and a response of the HTTP server may refer to the HTTP session.

In the present invention, HTTP traffic may be a message exchanged between an HTTP client and an HTTP server in an HTTP session and may have a character string form. The following description will be made on the premise of HTTP traffic, but, in addition to the HTTP traffic, a communication message expressed by a character string should be interpreted as being applicable.

Hereinafter, example embodiments of the present invention will be described in detail with reference to the accompanying drawings.

FIG. 1 is an exemplary diagram for describing a concept of a method and an apparatus for detecting abnormal traffic based on a convolutional autoencoder (CAE) according to one embodiment of the present invention.

A message which is exchangeable in a wired/wireless communication process may be expressed in a character string. According to one embodiment of the present invention, a method of detecting abnormal traffic by converting a character string according to a message, which is exchanged in a communication process, into an image and learning the image using an image learning-based CAE is proposed.

Referring to FIG. 1, in one embodiment of the present invention, a character string according to a communication message may be converted into an image to be used as an input image. When the input image is input to a CAE, the CAE may learn the input image and select coefficients of convolution layers so as to reduce a difference between an output image and the input image.

Meanwhile, the CAE may be referred to as a convolutional autoencoder which is a convolutional neural network including an encoder and a decoder. Here, the encoder may be constituted of layers for performing a process (encoding process) of forming hidden layers by compressing input data among a plurality of layers constituting the CAE, and the decoder may be constituted of layers for performing a process of generating output data from the hidden layers, the process of which is opposite the encoding process performed by the encoder.

In particular, the encoder may include a convolutional layer and a pooling layer, and the decoder may include an uppooling layer and a transposed convolutional layer. In this case, the encoder and the decoder may be connected to each other via a fully connected layer.

The convolutional layer may be a layer which extracts a feature (or a feature map) by performing an arithmetic multiplication (or convolution) of an input image with a filter. An interval value for performing the convolution may be referred to as a stride value. Feature maps having different sizes may be extracted according to the stride value.

The pooling layer is a layer for selecting features representative of a feature map by performing subsampling or pooling on an extracted feature map. Max pooling for extracting a largest value from a predetermined region of the feature map and average pooling for extracting an average value from the predetermined region thereof may be performed.

The fully connected layer may be a completely connected layer. The fully connected layer may be a layer which is connected to all activations of a previous layer.

The transposed convolutional layer may be a layer which, in reverse, performs the process of the convolutional layer performed in the encoder. The uppooling layer may be a layer which, in reverse, performs a process of the pooling layer.

When a type of an image which is not used in learning is input to a CAE which learns an image converted from a character string of normal traffic, a severely distorted output image is obtained. Therefore, it is easy to determine abnormal traffic using the fact that, when a character string of abnormal traffic, which is not learned, is converted into an input image and then the input image is output through a CAE, a severely distorted image is output.

Figure 2:
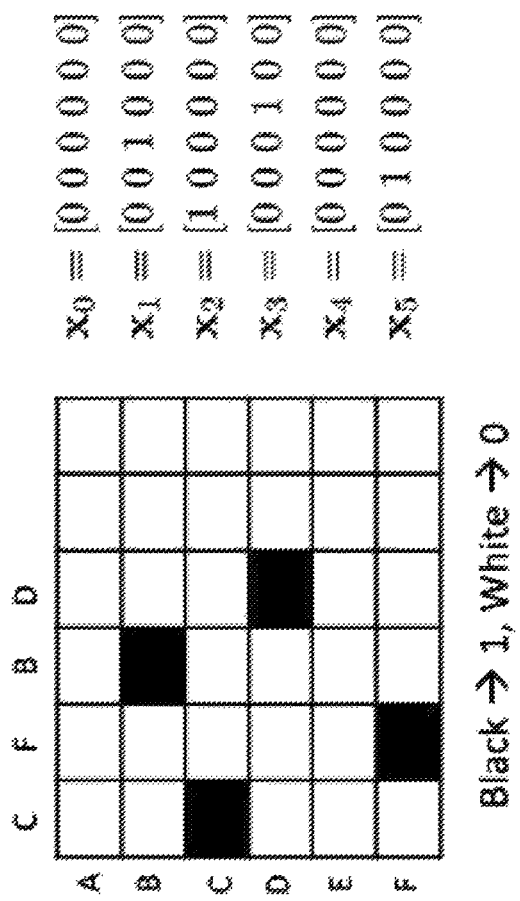
FIG. 2 is a conceptual diagram for describing a method of converting a character string into an image according to one embodiment of the present invention.
Figure 3:
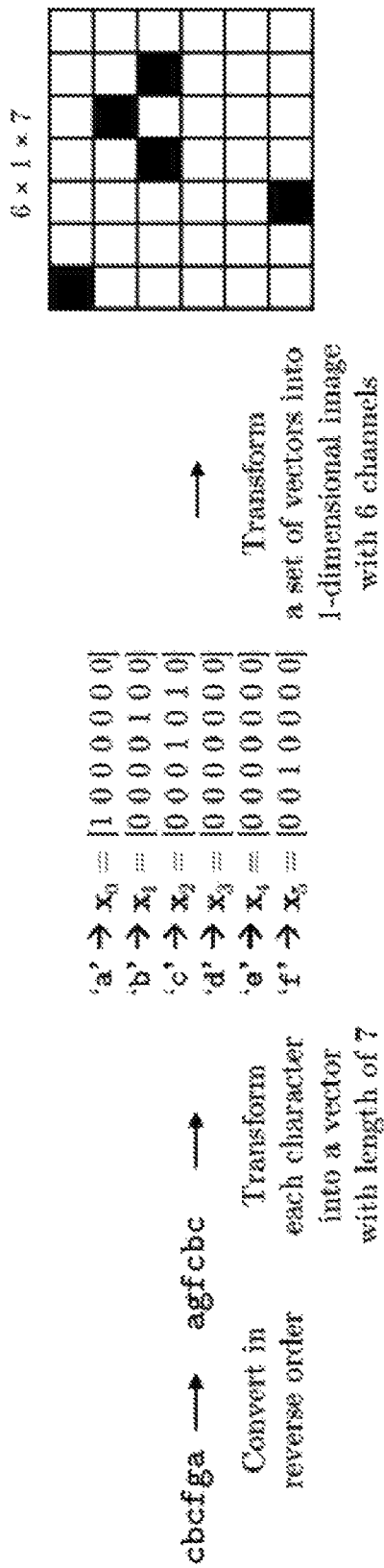
FIG. 3 is an exemplary diagram illustrating the method of converting a character string into an image according to one embodiment of the present invention.

FIG. 2 is a conceptual diagram for describing a method of converting a character string into an image according to one embodiment of the present invention. FIG. 3 is an exemplary diagram illustrating the method of converting a character string into an image according to one embodiment of the present invention.

Referring to FIG. 2, in one embodiment of the present invention, an individual character constituting a character string of traffic may be represented by a single vector ($x_0$, $x_1$, $x_2$, $x_3$, $x_4$, or $x_5$), and the vectors may be collected (or represented by a matrix) to express a single binary image form.

In FIG. 2, when a vector representing an individual character constitutes one row in a matrix, a matrix form of a one-hot vector may have a size of $F^{(0)} \times L^{(0)}$. Here, $F^{(0)}$ may refer to the number of character types capable of constituting traffic data, and $L^{(0)}$ may refer to a length of a sentence capable of being converted into a matrix. When a length of the character string of the traffic data is shorter than $L^{(0)}$, an insufficient vector may be represented by 0. When the length of the character string of the traffic data is longer than $L^{(0)}$, characters of a front portion may be represented by vectors equal to a length of $L^{(0)}$ so as to include a first character of the character string of the traffic data, and characters of a rear portion may be represented by vectors equal to the length of $L^{(0)}$ so as to include a last character, but the length of the sentence may be set by a user.

For example, referring back to FIG. 2, it is assumed that the characters capable of constituting the traffic data are "ABCDEF" and $L^{(0)}$ is 6. In this case, $F^{(0)}$ is the number of "ABCDEF" and may have a value of 6. Thus, a one-hot vector may have a 6×6 size. In such a setting, when a character string "DBFC" is converted, a last character "C" of the character string may appear in a first column, and "F," "B," and "D" may subsequently appear in a reverse order. Further, a length of $L^{(0)}$ is 6 and thus is longer than a length of the string which is 4. Consequently, the remaining fifth and sixth columns may be represented as 0. Since "C" is arranged at a third position of the character string "ABCDEF" capable of constituting the traffic data, "C" may appear in a third row, and subsequently, "F," "B," and "D" may appear in a sixth row, a second row, and a fourth row, respectively. Consequently, as shown in FIG. 2, "C" of "DBFC" may be arranged at (3, 1), "F" thereof may be arranged at (6, 2), and "D" thereof may be arranged at (4, 4).

As another example, referring to FIG. 3, a process of converting a character string into an image will be described by taking an example which a character string of traffic is "cbcfga." First, traffic data consisting of the character string may be converted into a one-hot vector in a reverse order from a last character of the character string. Here, the one-hot vector may refer to a vector with which a single dimensional value is 1 and all remaining dimensional values are 0. When a set of characters capable of being converted is set to {a, b, c, d, e, f}, and a length of a character string capable of being converted into one image (which corresponds to a length of a vector) is set to 7, a vector x0 of the last character "a" of the character string may be expressed as [1, 0, 0, 0, 0, 0, 0] because a character is arranged at a first position. Further, since "b" included in the character string is arranged at a second position from the rear side (or a fifth position from the front side) when the character string is constituted in a reverse order (agfcbc), "b" may be expressed as a vector [0, 0, 0, 0, 1, 0, 0] in which a value of a fifth element is 1. Furthermore, since "c" included in the character string is arranged at a fourth position and a sixth position from the rear side when the character string is constituted in a reverse order (agfcbc), "c" may be expressed as a vector [0, 0, 0, 1, 0, 1, 0] in which values of fourth and sixth elements are 1. Meanwhile, the length of the vector is assumed to be 7 so that the length of the vector is longer than the length of the character string, which is 6. Therefore, since there is no character corresponding to a last element of the vector, the last element of the vector may be set to "0." Similarly, when the characters "a," "g," and "f" are expressed, a vector corresponding to each of the characters constitutes a single channel (or a horizontal line of an image) to have 6 channels and a length of 7 such that the vector may be expressed as a one-dimensional image (6×1×7) having a size of 6×7. In this case, when an element value of the vector is 1, each pixel of the image may be represented as black, whereas when the element value of the vector is 0, each pixel of the image may be represented as white.

Meanwhile, how to process the number of allowable characters when converted into an image may be a problem. For example, allowable characters may be constituted as follows.

abcdefghijklmnopqrstuvwxyz0123456789,;.
!?:"'/\|_@#$%^&*~`+-=< >( )[ ]{ }

However, in such a case, an English capital letter should be converted into and expressed as a lowercase letter, and a non-included character may be processed as a blank. According to one embodiment of the present invention, in order to allow various characters to be input, a character string of traffic may be received by being encoded in unicode transformation format (UTF)-8, and then the input value may be converted into a unit of a hexadecimal number. In the hexadecimal number, a single value may be expressed with only the following character string.

0123456789abcdef

A single alphabetic character converted by UTF-8 may be expressed by two hexadecimal numbers. Therefore, even when only a character string expressing a single hexadecimal number is constituted by an allowable character string, all input characters may be expressed.

Figure 4:
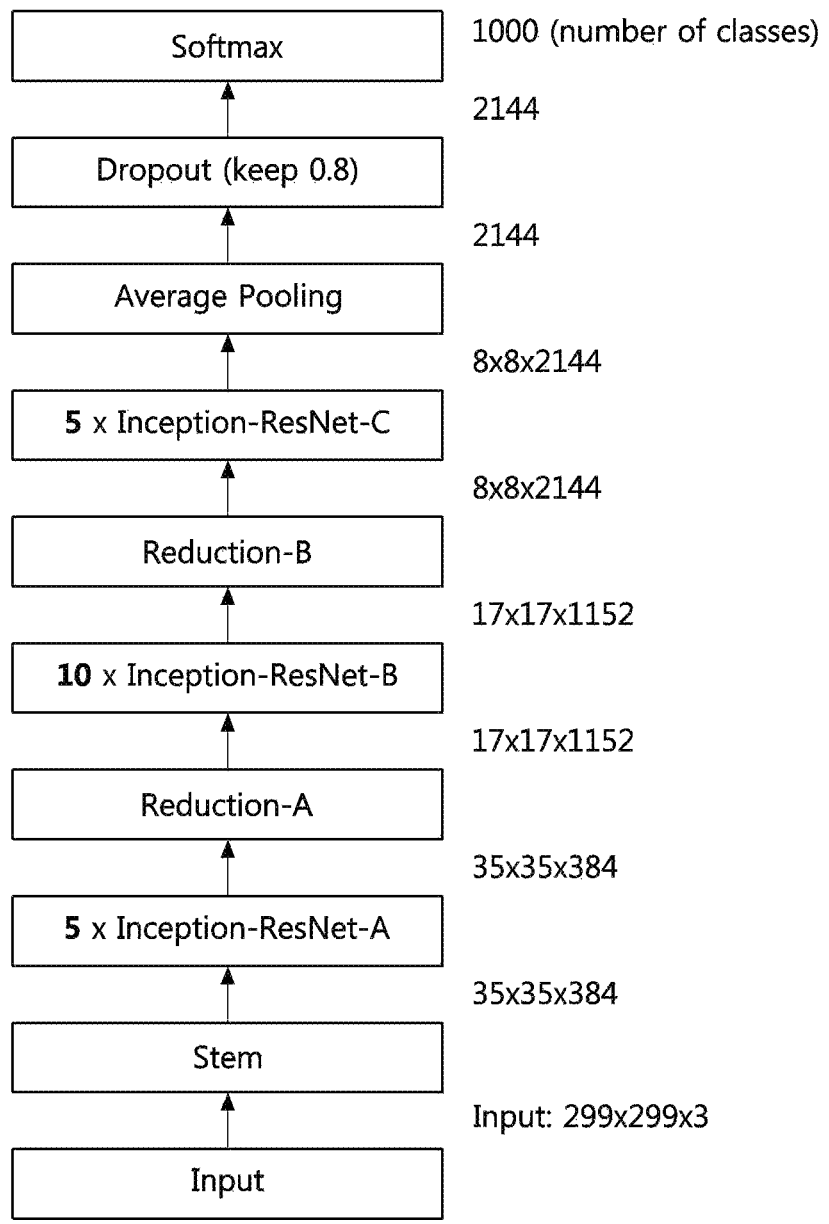
FIG. 4 is a conceptual diagram for describing an inception-residual network-v2 which is a basis of the CAE according to one embodiment of the present invention.

FIG. 4 is a conceptual diagram for describing an inception-residual network-v2 which is a basis of the CAE according to one embodiment of the present invention.

The CAE according to one embodiment of the present invention may be constituted based on the inception-residual network-v2 (Inception-ResNet-V2). Referring to FIG. 4, in order to encode input data, the Inception-ResNet-V2 includes Stem operation, 5 Inception-ResNet-A operations, Reduction-A operation, 10 Inception-ResNet-B operations, Reduction-B operation, 5 Inception-ResNet-C operations, Average Pooling operations, Dropout operations, and Softmax operations. In order to solve a characteristic of an inception network which has more layers by reducing a computational amount and a vanishing gradient problem in that a network becomes more deep such that learning is impossible, the Inception-ResNet-V2 may be a network which combines characteristics of a residual network in which reduces an output of a lower-level layer and adds an output of an upper-level layer to that of the lower-level layer.

The Inception-ResNet-V2 may generate a 1000-sized compressed data (or 100 classes) by receiving an input data having a size of 299×299, i.e., an image having a size of 299×299×3 and composed of three RGB channels. In FIG. 4, data displayed in each layer may be expressed by an image having (height×width×number of channels) or the number of pieces of data.

In addition, with respect to the Inception-ResNet-V2, Inception-v4, inception-resnet and the impact of residual connections on learning (2016) by Christian Szegedy may be referred to.

The CAE according to one embodiment of the present invention, which is an autoencoder modified based on the above-described Inception-ResNet-V2, will be described in detail below.

Figure 5:
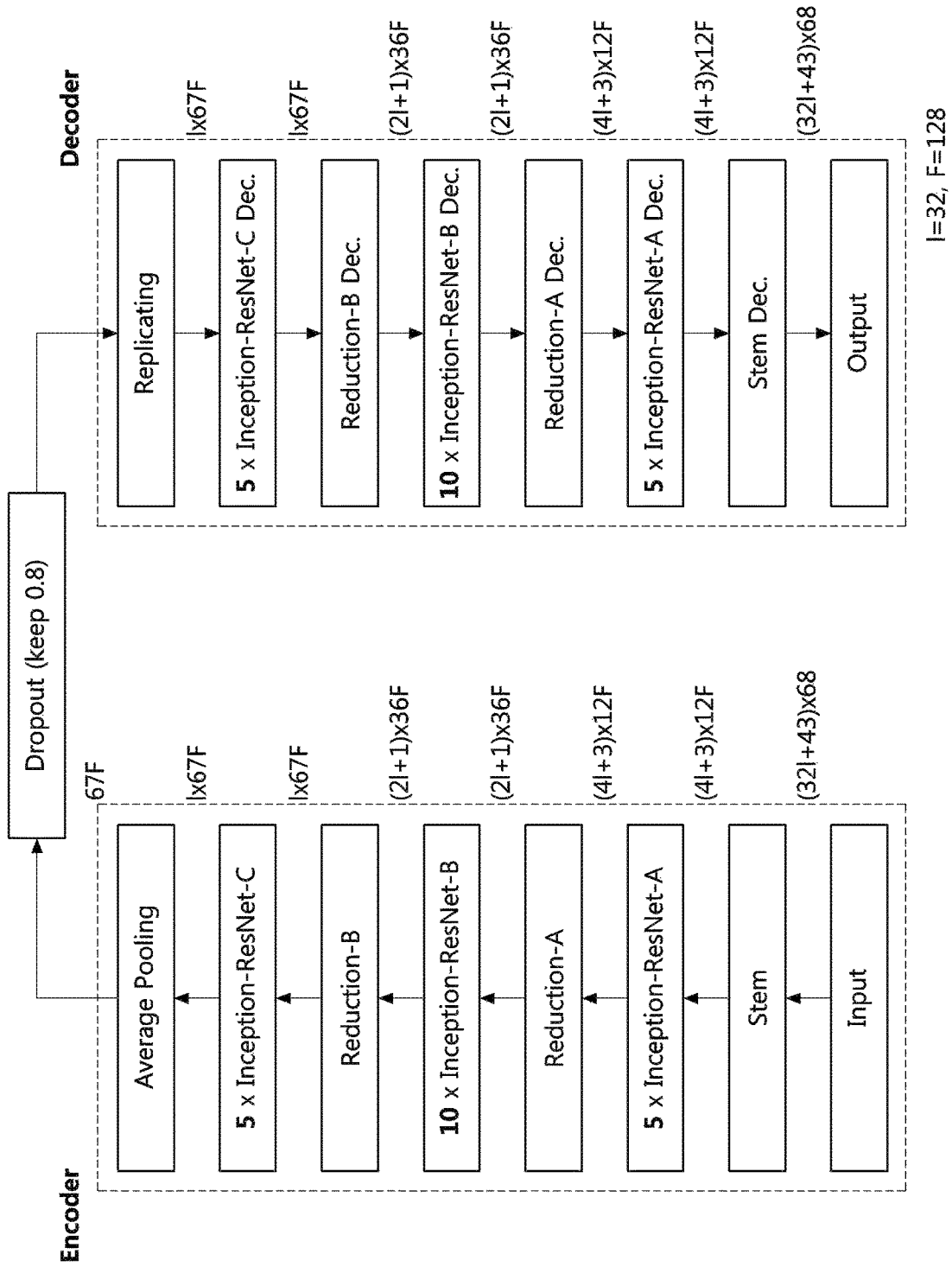
FIG. 5 is a conceptual diagram for describing a configuration of the CAE according to one embodiment of the present invention.

FIG. 5 is a conceptual diagram for describing a configuration of the CAE according to one embodiment of the present invention.

Referring to FIG. 5, the CAE according to one embodiment of the present invention may include encoding operations based on the Inception-ResNet-V2 and decoding operations corresponding to encoding operations. In this case, an encoder performing encoding operation may be constituted of layers from an input of the Inception-ResNet-V2 to an average pooling layer in FIG. 4, and a decoder may be constituted of a layer performing the process of the encoder in reverse.

In this case, the CAE may compare an input image with output data to adjust a parameter or a weight value so as to reduce an error. The parameter or the weight value may be adjusted in 5 Inception-ResNet-A operations, 10 Inception-ResNet-B operations, and 5 Inception-ResNet-C operations though scaling of each of the operations.

Unless otherwise described in this disclosure including the drawings of the present invention, F may refer to 128 as a basic frame size, V may refer to valid convolution or valid max pooling, stride may refer to an interval with which the convolution or the max pooling is performed, and linear may refer to performing full convolution without an activation function. Conv. may refer to convolution, and Conv. Trans. may refer to a reverse of the convolution. MaxPool may refer to the max pooling, and MaxUnPool may refer to a reverse of the max pooling. A×B Conv. may refer to performing the convolution with reference to a size of A×B, and A×B MaxPool may refer to performing the max pooling with reference to the size of A×B. Descriptions of the above-described symbols may be consistently used in the same meanings in this disclosure of the present invention.

Figure 6:
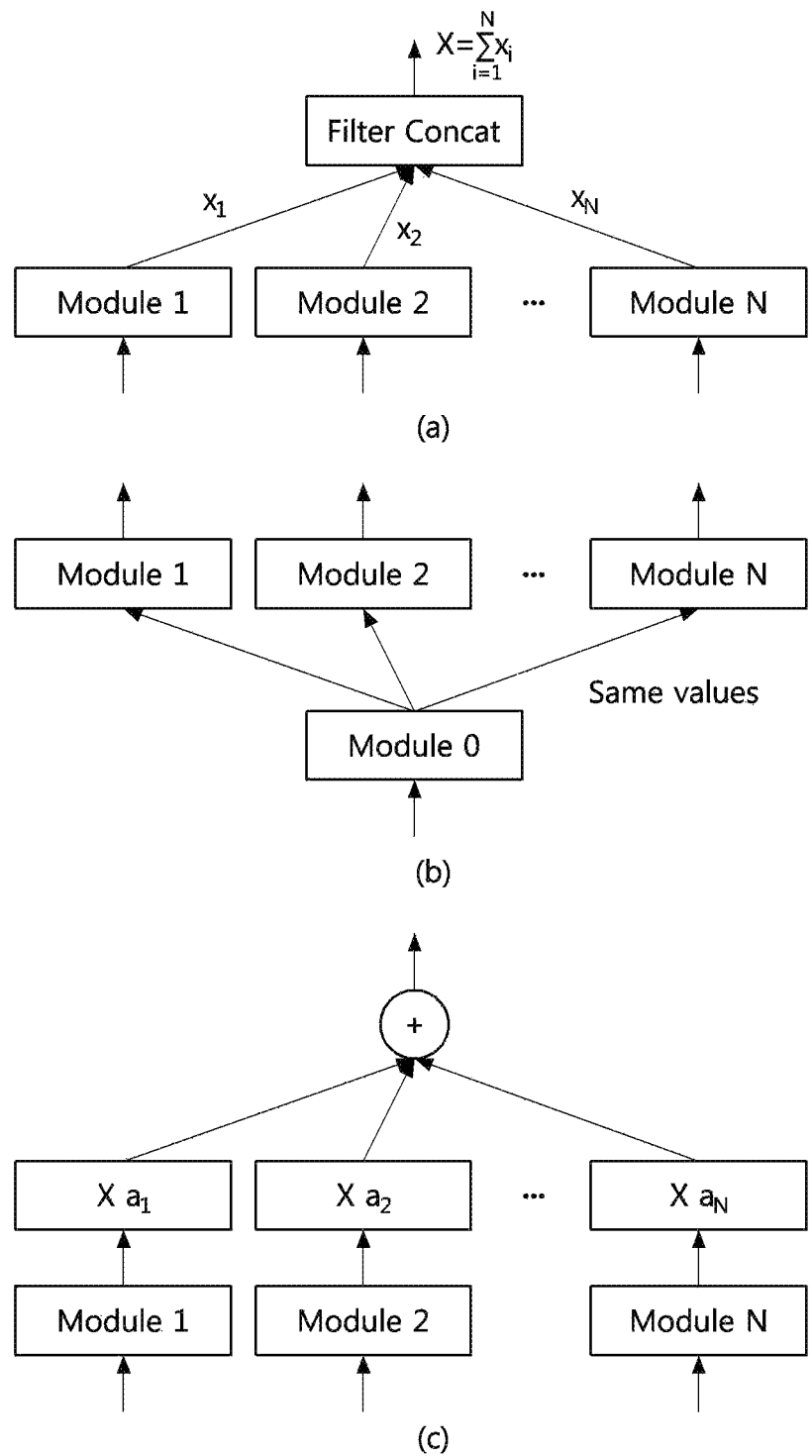
FIG. 6 is a conceptual diagram for describing a structure of an encoder in the CAE according to one embodiment of the present invention.

FIG. 6 is a conceptual diagram for describing a structure of an encoder in the CAE according to one embodiment of the present invention.

In particular, FIG. 6 is a conceptual diagram for describing adding, distributing, and scaling of encoding operation. Referring to FIG. 6A, in encoding operation of the CAE according to one embodiment of the present invention, Filter Concat may add up output data of modules and express the output data using a sigma symbol. In other words, output data X of Filter Concat may be expressed by the sum of the output data, $x_1, x_2, \ldots, x_N$ of the modules. Referring to FIG. 6B, in encoding operation of the CAE according to the present invention, the distributing may represent that the output data is distributed to the same output data. Referring to FIG. 6C, in the CAE of the present invention, the scaling adds values obtained by multiplying the output data of the modules by $a_1, a_2, \ldots, a_N$. Here, $a_1, a_2, \ldots, a_N$ may refer to parameters or weight values of an encoded part, and learning may be proceeded with by adjusting $a_1, a_2, \ldots, a_N$.

Figure 7:
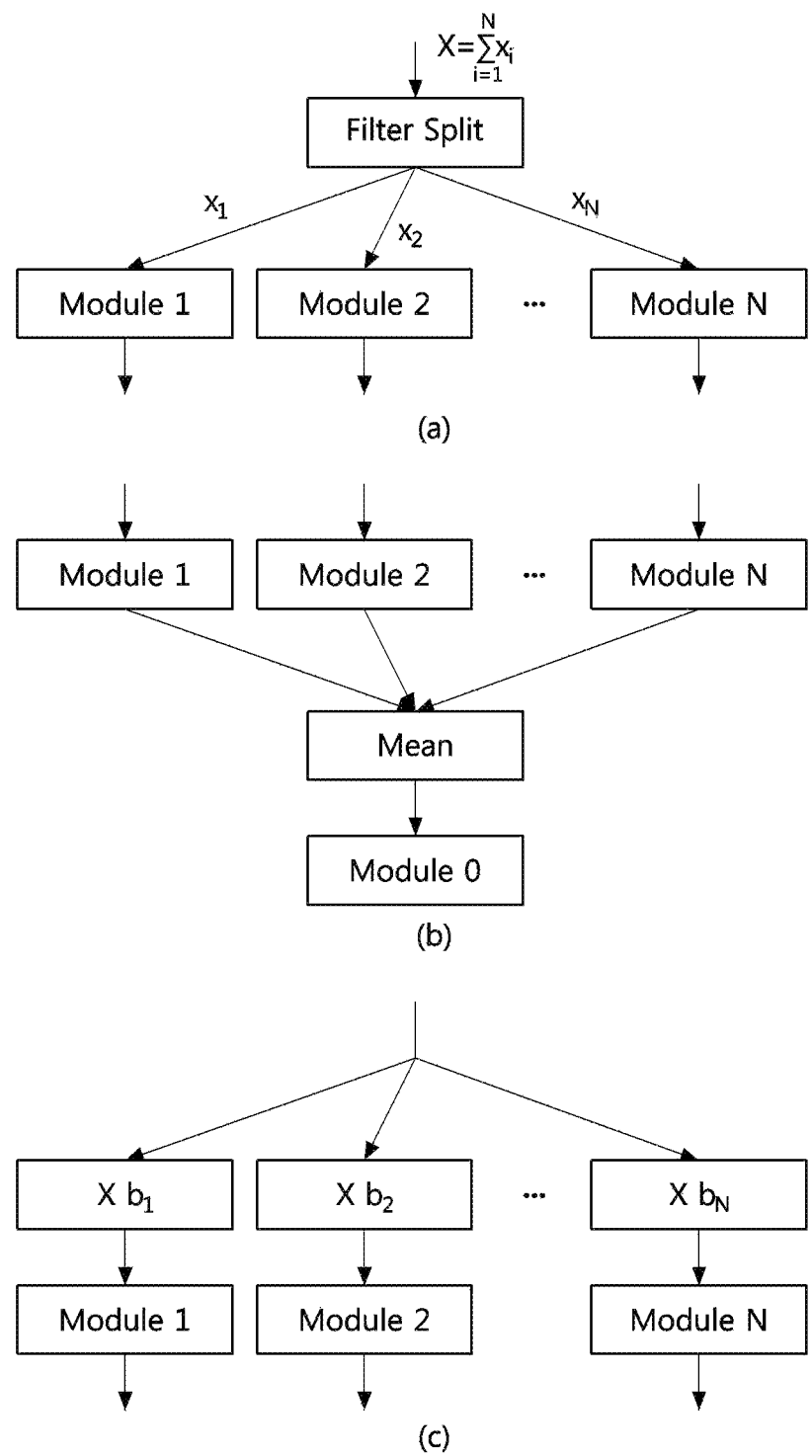
FIG. 7 is a conceptual diagram for describing a structure of a decoder corresponding to the structure of the encoder in the CAE according to one embodiment of the present invention.

FIG. 7 is a conceptual diagram for describing a structure of the decoder corresponding to the structure of the encoder in the CAE according to one embodiment of the present invention.

In particular, FIG. 7 is a conceptual diagram for describing distributing, averaging, and scaling of the decoding operations. Referring to FIG. 7A, in decoding operation of the CAE according to one embodiment of the present invention, Filter Split may divide and distribute output data of a higher-level module to modules, and the sum of the output data distributed to the modules may be equal to the output data of the higher-level module. Like in the encoding operation, Filter Split may also express the sum using a sigma symbol. In other words, output data X of an upper level of Filter Split may be expressed by the sum of the output data $x_1, x_2, \ldots, x_N$ distributed to the modules. Referring to FIG. 7B, in decoding operation of the CAE according to the present invention, Mean may calculate an average of the output data of higher-level modules. Further, referring to FIG. 7C, in the CAE of the present invention, the scaling distributes the output data of the higher-level module and multiplies the distributed output data by $b_1, b_2, \ldots, b_N$. Here $b_1, b_2, \ldots, b_N$ may refer to parameters or weight values of a decoded part, and learning may be proceeded by adjusting $b_1, b_2, \ldots, b_N$.

Figure 8:
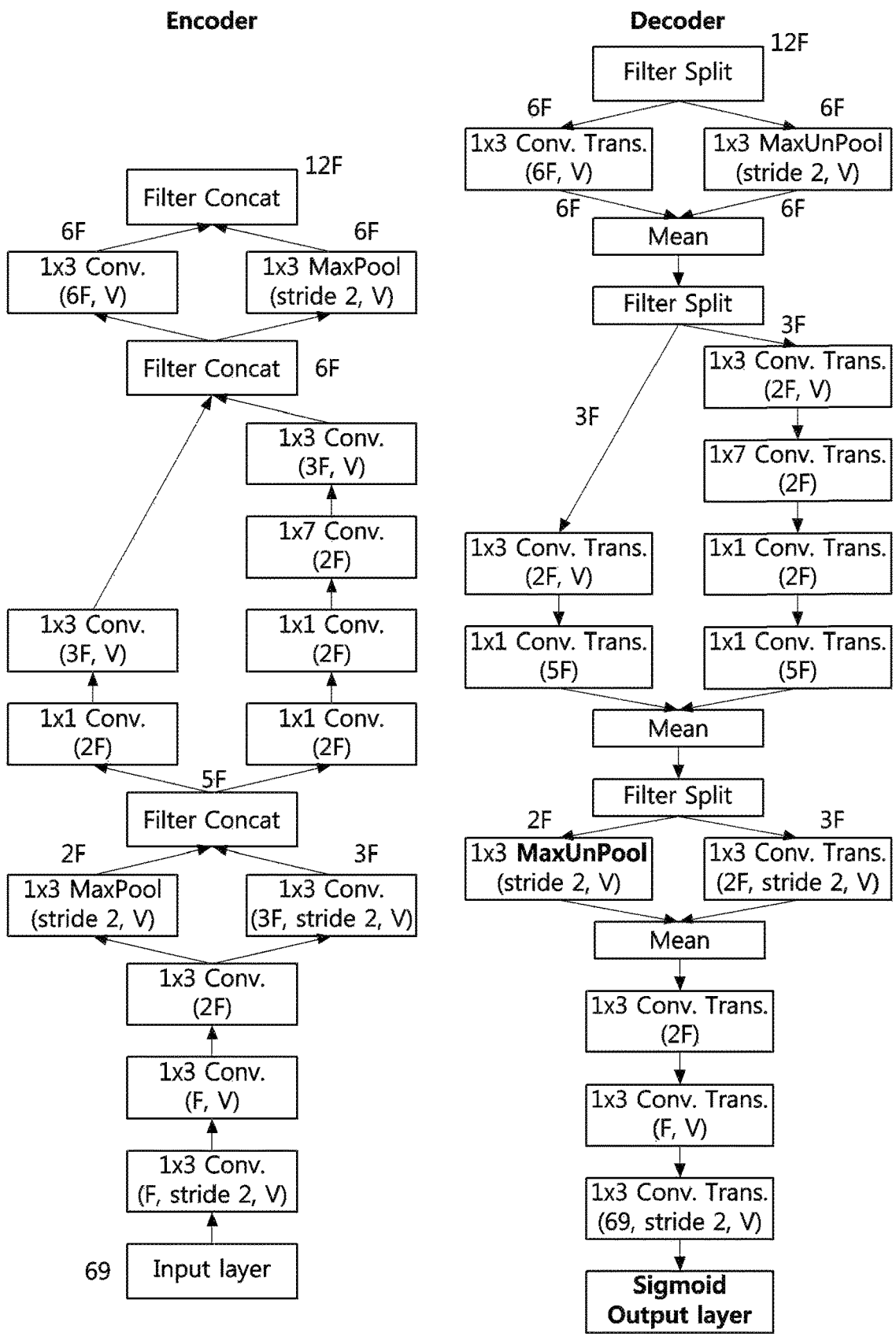
FIG. 8 is a conceptual diagram for describing Stem operations in the CAE according to one embodiment of the present invention.

FIG. 8 is a conceptual diagram for describing the Stem operations in the CAE according to one embodiment of the present invention.

Referring to FIG. 8, Stem operation of the CAE according to one embodiment of the present invention may be performed in each of the encoder and the decoder of FIG. 5. In other words, Stem operation of an encoder of FIG. 8 may be performed in the encoder of FIG. 5, and Stem operation of a decoder of FIG. 8 may be performed in the decoder of FIG. 5. Stem operation of the encoder may sequentially perform 1×3 Conv.(stride 2), 1×3 Conv., and 1×3 Conv. on input data, distribute output data of the last 1×3 Conv. to perform 1×3 MaxPool(stride 2) and 1×3 Conv.(stride 2), sum the distributed and processed output data and redistribute the summed output data, and sequentially perform 1×1 Conv. and 1×3 Conv. at one side and 1×1 Conv., 1×1 Conv., 1×7 Conv. and 1×3 Conv. at the other side. 1×3 Conv. and 1×3 MaxPool (stride 2) may be performed by re-summing and redistributing the distributed and processed output data, and then the redistributed and processed output data may be re-summed. Further, Stem operation of the CAE according to the present invention may be performed in the same manner as not only Stem operation, which is described above, but also Stem operation of a conventional Inception-ResNet-V2, but the present invention is not limited thereto. Stem operation of the decoder may be reversely performed as compared with Stem operation of the encoder.

Figure 9:
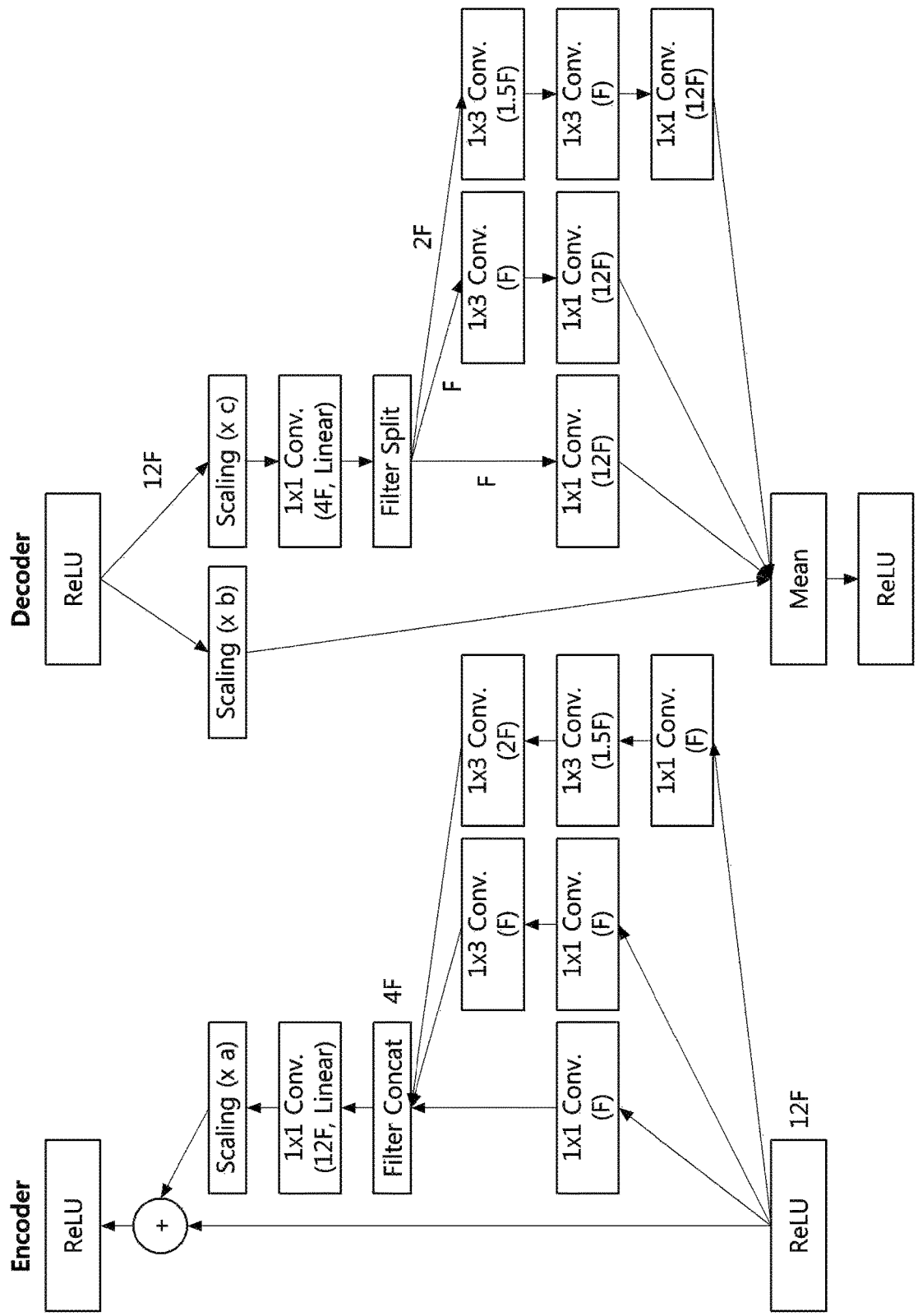
FIG. 9 is a conceptual diagram for describing Inception-ResNet-A operation in the CAE according to one embodiment of the present invention.

FIG. 9 is a conceptual diagram for describing Inception-ResNet-A operation in the CAE according to one embodiment of the present invention.

Referring to FIG. 9, Inception-ResNet-A operation of the CAE according to one embodiment of the present invention may be performed in each of the encoder and the decoder of FIG. 5. In other words, Inception-ResNet-A operation of an encoder of FIG. 9 may be performed in the encoder of FIG. 5, and Inception-ResNet-A operation of a decoder of FIG. 9 may be performed in the decoder of FIG. 5. Inception-ResNet-A operation of the encoder may distribute input data into four pieces of data, sequentially perform 1×1 Conv., 1×3 Conv. and 1×3 Conv. on the first distributed data, sequentially perform 1×1 Conv. and 1×3 Conv. on the second distributed data, and perform 1×1 Conv. on the third distributed data. The first, second, and third distributed data may be summed to undergo 1×1 Conv. (Linear) and scaling, and input data which does not undergo any operation among the scaled output data and the four distributed input data may be added. Further, Inception-ResNet-A operation of the CAE according to the present invention may be performed in the same manner as not only Inception-ResNet-A operation, which is described above, but also Inception-ResNet-A operation of the conventional Inception-ResNet-V2, but the present invention is not limited thereto. Inception-ResNet-A operation of the decoder may be reversely performed as compared with Inception-ResNet-A operation of the encoder.

The CAE according to one embodiment of the present invention may adjust scaling sizes a, b, and c of the Inception-ResNet-A operation, and learning may be performed through the adjustment.

Figure 10:
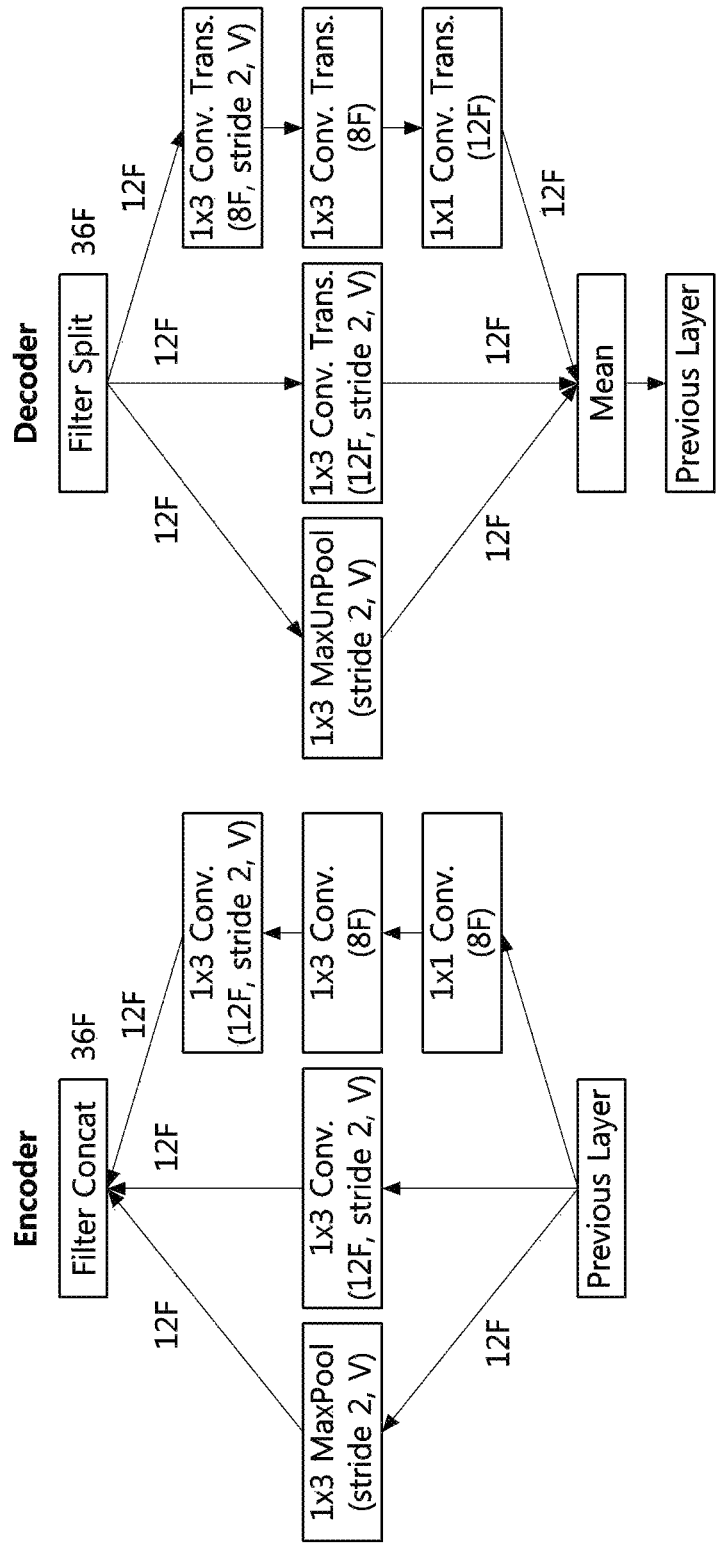
FIG. 10 is a conceptual diagram for describing Reduction-A operation in the CAE according to one embodiment of the present invention.

FIG. 10 is a conceptual diagram for describing the Reduction-A operations in the CAE according to one embodiment of the present invention.

Referring to FIG. 10, Reduction-A operation of the CAE according to one embodiment of the present invention may be performed in each of the encoder and the decoder of FIG. 5. In other words, Reduction-A operation of an encoder of FIG. 10 may be performed in the encoder of FIG. 5, and Reduction-A operation of a decoder of FIG. 10 may be performed in the decoder of FIG. 5. Reduction-A operation of the encoder may distribute input data into three pieces of data, sequentially perform 1×1 Conv., 1×3 Conv., and 1×3 Conv. (stride 2) on the first distributed data, perform 1×3 Conv. (stride 2) on the second distributed data, and perform 1×3 MaxPool (stride 2) on the third distributed data. Further, Reduction-A operation of the encoder may sum the distributed and processed input data to generate output data of Reduction-A operation. Reduction-A operation of the CAE according to the present invention may be performed in the same manner as not only Reduction-A operation, which is described above, but also Reduction-A operation of the conventional Inception-ResNet-V2, but the present invention is not limited thereto. Reduction-A operation of the decoder may be performed in reverse as compared with Reduction-A operation of the encoder.

Figure 11:
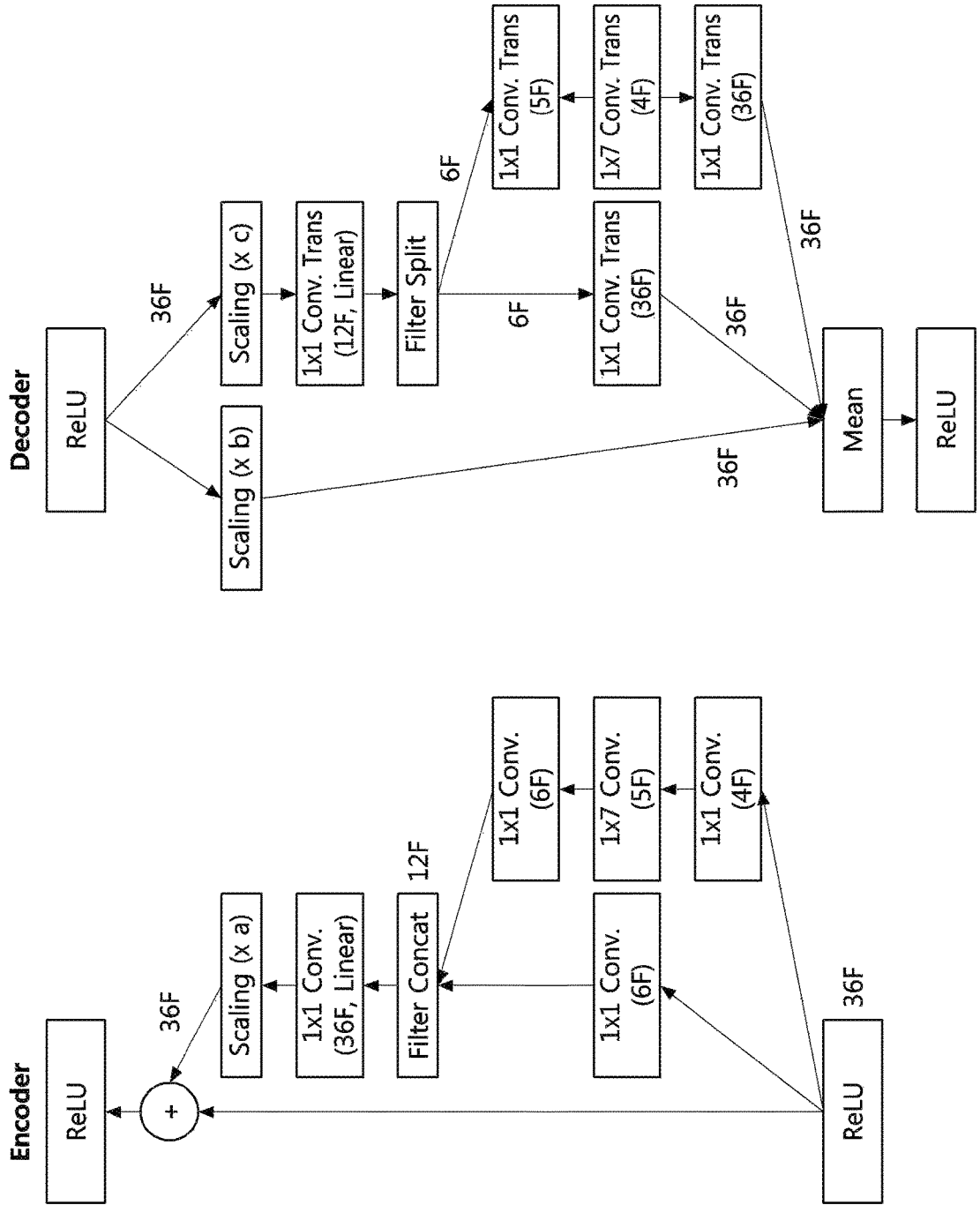
FIG. 11 is a conceptual diagram for describing Inception-ResNet-B operation in the CAE according to one embodiment of the present invention.

FIG. 11 is a conceptual diagram for describing Inception-ResNet-B operation in the CAE according to one embodiment of the present invention.

Referring to FIG. 11, Inception-ResNet-B operation of the CAE according to one embodiment of the present invention may be performed in each of the encoder and the decoder of FIG. 5. In other words, Inception-ResNet-B operation of an encoder of FIG. 11 may be performed in the encoder of FIG. 5, and Inception-ResNet-B operation of a decoder of FIG. 11 may be performed in the decoder of FIG. 5. Inception-ResNet-B operation of the encoder may distribute input data to three pieces of data, sequentially perform 1×1 Conv., 1×7 Conv. and 1×1 Conv. on the first distributed data and perform 1×1 Conv. on the second distributed data. The first and second distributed data may be summed to undergo 1×1 Conv. (Linear) and scaling, and output data which does not undergo any operation among the scaled output data and the three distributed data may be added. Further, Inception-ResNet-B operation of the CAE according to the present invention may be performed in the same manner as not only Inception-ResNet-B operation, which is described above, but also Inception-ResNet-B operation of the conventional Inception-ResNet-V2, but the present invention is not limited thereto. Inception-ResNet-B operation of the decoder may be performed in reverse as compared with Inception-ResNet-B operation of the encoder.

The CAE according to one embodiment of the present invention may adjust scaling sizes a, b, and c of the Inception-ResNet-B operation, and learning may be performed through the adjustment.

Figure 12:
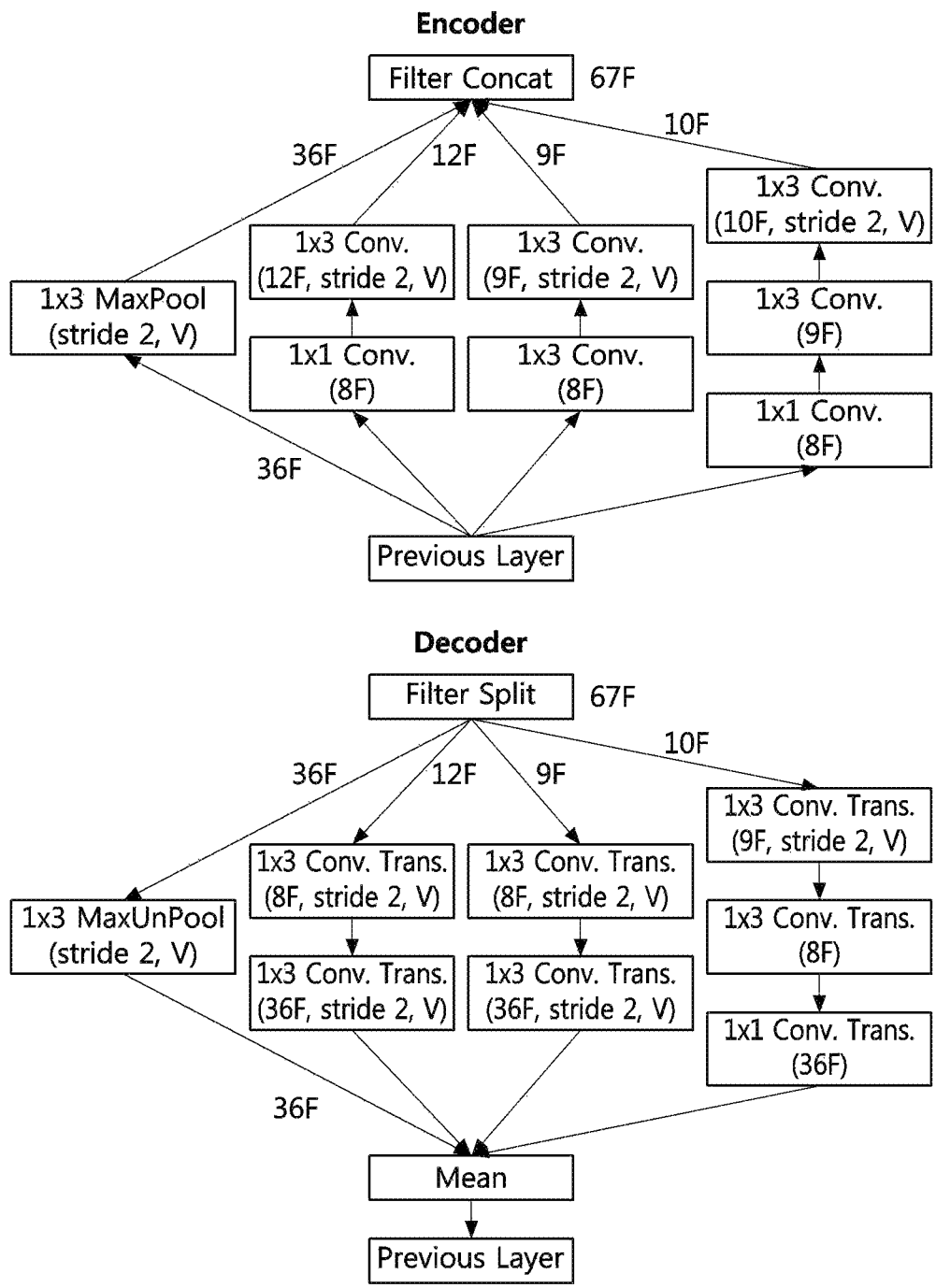
FIG. 12 is a conceptual diagram for describing Reduction-B operations in the CAE according to one embodiment of the present invention.

FIG. 12 is a conceptual diagram for describing the Reduction-B operations in the CAE according to one embodiment of the present invention.

Referring to FIG. 12, Reduction-B operation of the CAE according to one embodiment of the present invention may be performed in each of the encoder and the decoder of FIG. 5. In other words, Reduction-B operation of an encoder of FIG. 12 may be performed in the encoder of FIG. 5, and Reduction-B operation of a decoder of FIG. 12 may be performed in the decoder of FIG. 5. Reduction-B operation of the encoder may distribute input data into four pieces of data, sequentially perform 1×1 Conv., 1×3 Conv., and 1×3 Conv.(stride 2) on the first distributed data, perform 1×3 Conv. and 1×3 Conv.(stride 2) on the second distributed data, perform 1×1 Conv. and 1×3 Conv.(stride 2) on the third distributed data, and perform 1×3 MaxPool(stride 2) on the fourth distributed data. Further, Reduction-B operation of the encoder may sum the distributed and processed input data to generate output data of Reduction-B operation. Reduction-B operation of the CAE according to the present invention may be performed in the same manner as not only Reduction-B operation, which is described above, but also Reduction-B operation of the conventional Inception-ResNet-V2, but the present invention is not limited thereto. Reduction-B operation of the decoder may be reversely performed as compared with Reduction-B operation of the encoder.

Figure 13:
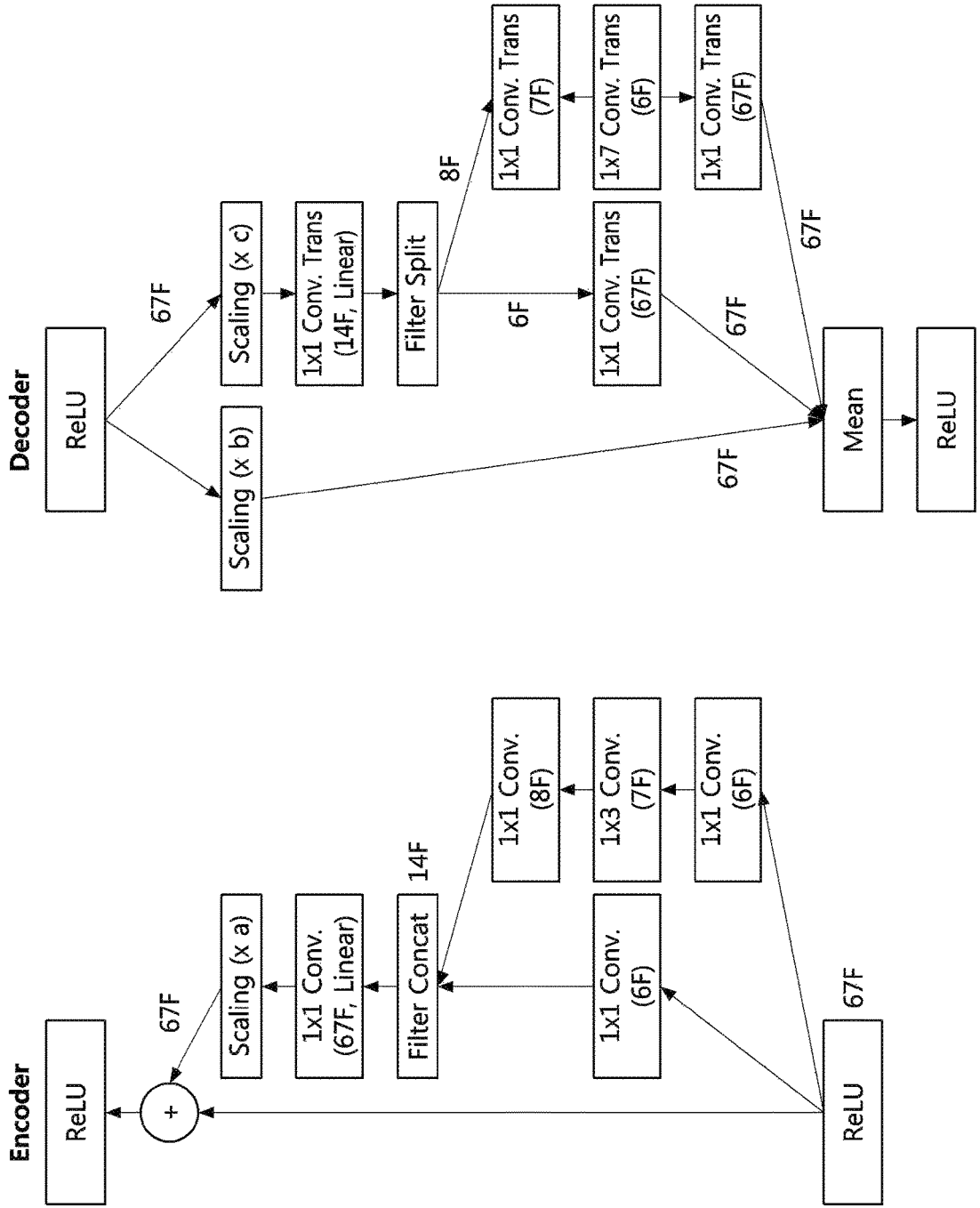
FIG. 13 is a conceptual diagram for describing Inception-ResNet-C operations in the CAE according to one embodiment of the present invention.

FIG. 13 is a conceptual diagram for describing the Inception-ResNet-C operations in the CAE according to one embodiment of the present invention.

Referring to FIG. 13, Inception-ResNet-C operation of the CAE according to one embodiment of the present invention may be performed in each of the encoder and the decoder of FIG. 5. In other words, Inception-ResNet-C operation of an encoder of FIG. 13 may be performed in the encoder of FIG. 5, and Inception-ResNet-C operation of a decoder of FIG. 13 may be performed in the decoder of FIG. 5. Inception-ResNet-C operation of the encoder may distribute input data into three pieces of data, sequentially perform 1×1 Conv., 1×3 Conv. and 1×1 Conv. on the first distributed data, and perform 1×1 Conv. on the second distributed data. The first and second distributed data may be summed to undergo 1×1 Conv. (Linear) and scaling, and output data which does not undergo any operation among the scaled output data and the three distributed data may be added. Further, Inception-ResNet-C operation of the CAE according to the present invention may be performed in the same manner as not only Inception-ResNet-C operation, which is described above, but also Inception-ResNet-C operation of the conventional Inception-ResNet-V2, but the present invention is not limited thereto. Inception-ResNet-C operation of the decoder may be performed in reverse as compared with Inception-ResNet-C operation of the encoder.

The CAE according to one embodiment of the present invention may adjust scaling sizes a, b, and c of the Inception-ResNet-C operation, and learning may be performed through the adjustment.

Figure 14:
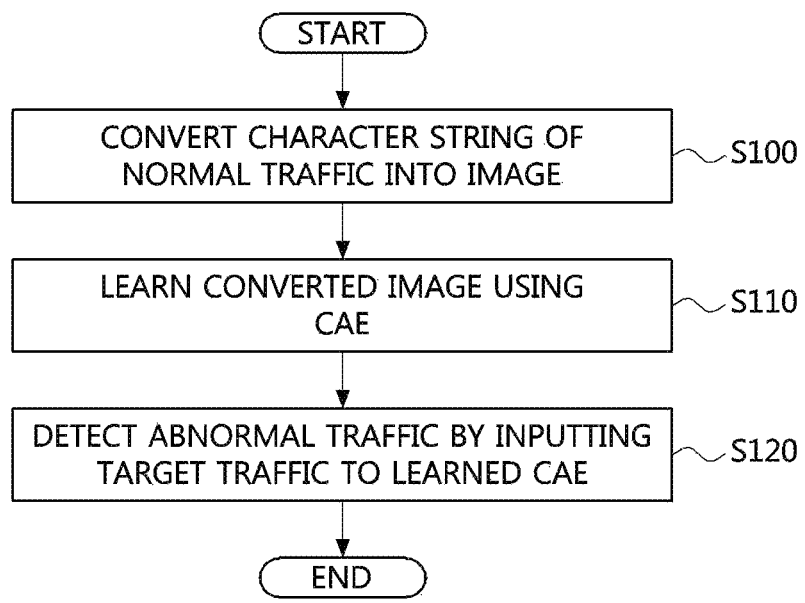
FIG. 14 is a flowchart illustrating a method of detecting abnormal traffic based on the CAE according to one embodiment of the present invention.

FIG. 14 is a flowchart illustrating a method of detecting abnormal traffic based on the CAE according to one embodiment of the present invention.

Referring to FIG. 14, the method of detecting abnormal traffic may include converting a character string of normal traffic into an image (S100), learning the converted image using the CAE (S110), and detecting abnormal traffic by inputting target traffic to the learned CAE (S120).

The converting of the character string into the image (S100) may include obtaining the normal traffic in the form of UTF-8 and converting the obtained character string of the normal traffic into a hexadecimal number.

The converting of the character string into the image (S100) may include converting the character string of the normal traffic in a reverse order, converting characters constituting the character string converted in the reverse order into vectors, and converting the vector-converted character string into an image.

In addition, the converting of the character string into the image (S100) may be referred to with the description of FIGS. 1 to 3.

The CAE may be an autoencoder constituted based on Inception-ResNet-V2. More specifically, the CAE may be referred to with the description of FIGS. 4 to 13.

The detecting of the abnormal traffic (S120) may include converting the target traffic into an image and evaluating binary cross entropy (BCE) or binary cross varentropy (BCV) on an output obtained by inputting the target traffic converted into the image to the learned CAE.

The BCE may be defined by the following, Equation 1.

$$BCE_n = -\frac{1}{KL}\sum_{k=0}^{K-1}\sum_{l=0}^{L-1}\left(x_{kl}^{(n)}\log\hat{x}_{kl}^{(n)} + (1-x_{kl}^{(n)})\log(1-\hat{x}_{kl}^{(n)})\right) \quad \text{[Equation 1]}$$

In Equation 1, the number of channels may be K, a length of a sequence (or a length of the character string) may be L, $x_{kl}^{(n)}$ may be a binary value of a pixel 1 for the target traffic converted into the image or, more accurately, for a channel k in an $n^{th}$ sample, and $\hat{x}_{kl}^{(n)}$ may be an output value of the CAE for the n-th sample.

Generally, in a character-based image conversion, each channel (each character) is mostly converted into a vector having 0 as an element so that each channel has a very small number of 1's. Therefore, when BCE is calculated for normal traffic, most pixel values constituting an output image may have a value close to 0.

Therefore, according to one embodiment of the present invention, a BCE value of the n-th sample is calculated according to Equation 1 and the calculated BCE value is compared with a threshold value such that whether traffic is abnormal may be determined. In particular, when the calculated BCE value is larger than the threshold value, the input target traffic may be detected as abnormal traffic.

In this case, in order to evaluate the BCE and detect the abnormal traffic, it may be necessary for the CAE to learn using a cost function defined based on the BCE.

The cost function defined based the basis BCE is expressed by the following, Equation 2.

$$\text{total } BCE = -\frac{1}{NKL}\sum_{n=0}^{N-1}\sum_{k=0}^{K-1}\sum_{l=0}^{L-1}\left(x_{kl}^{(n)}\log\hat{x}_{kl}^{(n)} + (1-x_{kl}^{(n)})\log(1-\hat{x}_{kl}^{(n)})\right) \quad \text{[Equation 2]}$$

Referring to Equation 2, when the number of data samples which will be learned is defined as N, the cost function according to Equation 2 may be interpreted to calculate total BCE by calculating, adding, and dividing Equation 1 for each of the N data samples.

Accordingly, the learning of the converted image using the CAE may include determining parameters of the CAE so as to minimize a cost function defined by the BCE.

Meanwhile, referring back to Equation 1 used for detecting abnormal traffic, Equation 1 performs logarithm and obtains an average on output pixel values and thus there is a problem of insufficiently reflecting a characteristic that the abnormal traffic has various values. In this case, since dispersion is a statistical value which measures how widely values are distributed based on an average, probability of detection performance improvement may be increased when the dispersion is utilized.

In particular, an evaluation function according to a case in which abnormal traffic is detected based on the dispersion proposed in the present invention may be called BCV. In this case, the BCV for the n-th data sample which will be detected may be defined as the following, Equation 3.

$$BCV_n = \frac{1}{KL}\sum_{k=0}^{K-1}\sum_{l=0}^{L-1}\left(-x_{kl}^{(n)}\log\hat{x}_{kl}^{(n)} - (1-x_{kl}^{(n)})\log(1-\hat{x}_{kl}^{(n)}) - BCE_n\right)^2 \quad \text{[Equation 3]}$$

In Equation 3, $BCE_n$ may refer to a calculated value according to Equation 1, and other variables may be referred to with the description of Equations 1 and 2.

When the BCV proposed in one embodiment of the present invention is utilized, since the logarithm is performed on the pixel values and then a dispersion value is calculated as in Equation 1, it is possible to sufficiently reflect various characteristics of the abnormal traffic.

Meanwhile, when the abnormal traffic is detected using the evaluation function according to Equation 3, the cost function used for the CAE to learn needs to reflect the BCV according to Equation 3.

In particular, determining parameters of the CAE to minimize the cost function defined by linearly combining total BCE for the BCE with total BCV for the BCV may be included. In this case, the cost function using the BCE and the BCV is expressed by the following, Equation 4.

$$\text{Cost function} = \beta \cdot \text{totalBCE} + \alpha \cdot \text{totalBCV} \quad \text{[Equation 4]}$$

In Equation 4, the total BCE may be referred to with Equation 2, $\alpha$ and $\beta$ are positive constants, and the total BCV may be defined as the following, Equation 5.

$$\text{total } BCV = \frac{1}{NKL}\sum_{n=0}^{N-1}\sum_{k=0}^{K-1}\sum_{l=0}^{L-1}\left(-x_{kl}^{(n)}\log\hat{x}_{kl}^{(n)} - (1-x_{kl}^{(n)})\log(1-\hat{x}_{kl}^{(n)}) - \text{total } BCE\right)^2 \quad \text{[Equation 5]}$$

Referring to Equation 5, the total BCV may be defined as a value obtained by performing the BCV according to Equation 3 on N data samples, adding the N data samples, and dividing the added N data samples by N.

Figure 15:
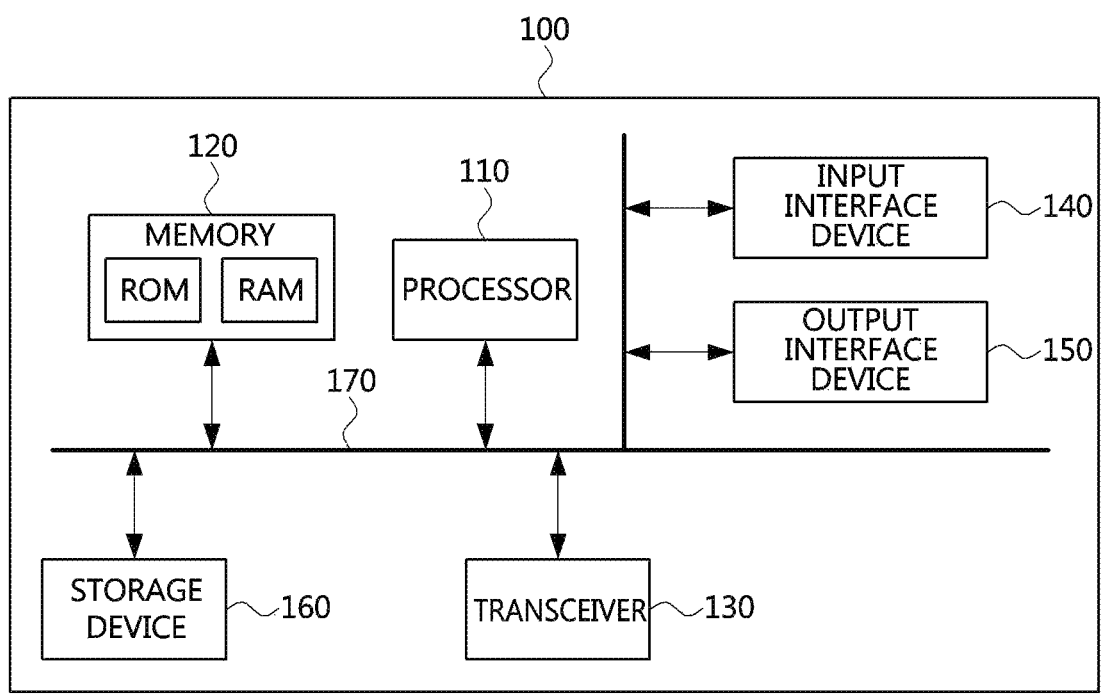
FIG. 15 is a block diagram of an apparatus for detecting abnormal traffic based on the CAE according to one embodiment of the present invention.

FIG. 15 is a block diagram of an apparatus for detecting abnormal traffic based on the CAE according to one embodiment of the present invention.

Referring to FIG. 15, an apparatus 100 for detecting abnormal traffic based on a CAE may include at least one processor 110 and a memory 120 configured to store instructions for directing the at least one processor 110 to perform at least one operation.

Here, the at least one processor 110 may refer to a central processing unit (CPU), a graphics processing unit (GPU), or a dedicated processor in which methods according to example embodiments of the present invention are performed. Each of the memory 120 and a storage device 160 may be constituted of at least one of a volatile storage medium and a nonvolatile storage medium. For example, the memory 120 may be constituted of at least one of a read only memory (ROM) and a random access memory (RAM).

Further, the apparatus 100 for detecting abnormal traffic based on a CAE may include a transceiver 130 for performing communication via a wireless network. Furthermore, the apparatus 100 for detecting abnormal traffic based on a CAE may further include an input interface device 140, an output interface device 150, the storage device 160, and the like. Each of the components included in the apparatus 100 for detecting abnormal traffic based on CAE may be connected by a bus 170 and may perform communication with one another.

The at least one operation may include converting a character string of normal traffic into an image, learning the converted image using the CAE, and detecting abnormal traffic by inputting target traffic to the learned CAE.

The detecting of the abnormal traffic may include converting the target traffic into an image and evaluating BCE or BCV on an output obtained by inputting the target traffic converted into the image to the learned CAE.

The converting of the character string into the image may include obtaining the normal traffic in the form of UTF-8 and converting the obtained character string of the normal traffic into a hexadecimal number.

The converting of the character string into the image may include converting the character string of the normal traffic in a reverse order, converting characters constituting the character string converted in the reverse order into vectors, and converting the vector-converted character string into an image.

The CAE may be an autoencoder constituted based on Inception-ResNet-V2.

The learning of the converted image using the CAE may include determining parameters of the CAE so as to minimize a cost function defined based on the BCE.

When the number of channels is K and a length of a sequence is L, the BCE may be defined as the following Equation with respect to a target traffic $x_{kl}^{(n)}$ converted into the image and an output $\hat{x}_{kl}^{(n)}$.

$$BCE_n = -\frac{1}{KL}\sum_{k=0}^{K-1}\sum_{l=0}^{L-1}\left(x_{kl}^{(n)}\log\hat{x}_{kl}^{(n)} + (1 - x_{kl}^{(n)})\log(1 - \hat{x}_{kl}^{(n)})\right)$$

When the number of channels is K and the length of the sequence is L, the BCV may be defined as the following equation with respect to the target traffic $x_{kl}^{(n)}$ converted into the image and the output $\hat{x}_{kl}^{(n)}$.

$$BCV_n = \frac{1}{KL}\sum_{k=0}^{K-1}\sum_{l=0}^{L-1}\left(-x_{kl}^{(n)}\log\hat{x}_{kl}^{(n)} - (1 - x_{kl}^{(n)})\log(1 - \hat{x}_{kl}^{(n)}) - BCE_n\right)^2$$

The learning of the converted image using the CAE may include determining parameters of the CAE to minimize the cost function defined by linearly combining total BCE according to the BCE with total BCV according to the BCV.

The cost function may be defined as the following equation.

Cost function=$\beta \cdot totalBCE + \alpha \cdot totalBCV$

Examples of the apparatus 100 for detecting abnormal traffic based on a CAE include a communicateable desktop computer, a laptop computer, a notebook, a smart phone, a tablet personal computer (PC), a mobile phone, a smart watch, a smart glass, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), and the like.

Figure 16:
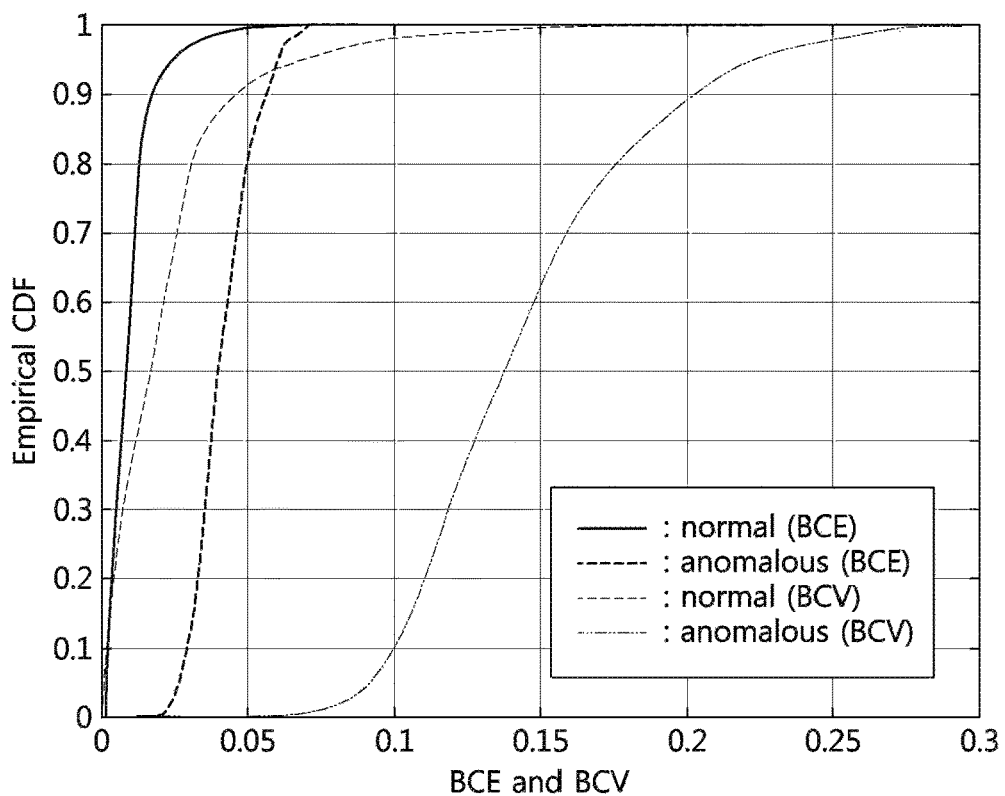
FIGS. 16 to 18 are graphs showing experimental results of the method and the apparatus for detecting abnormal traffic based on the CAE according to one embodiment of the present invention.
Figure 17:
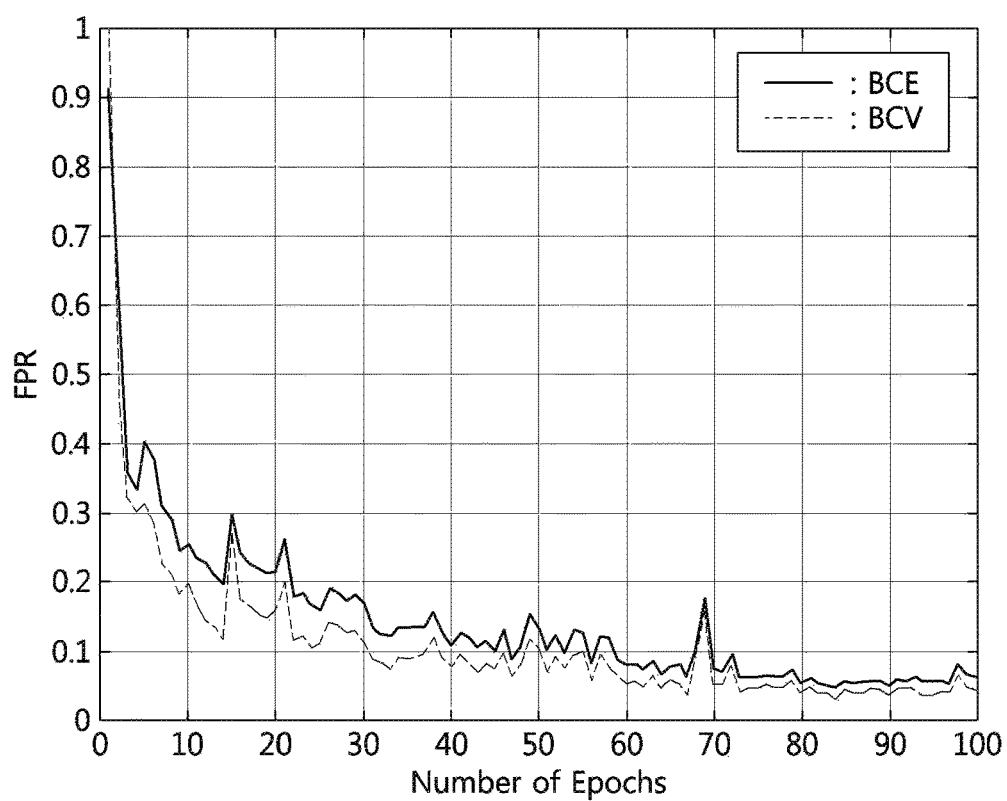
Figure 18:
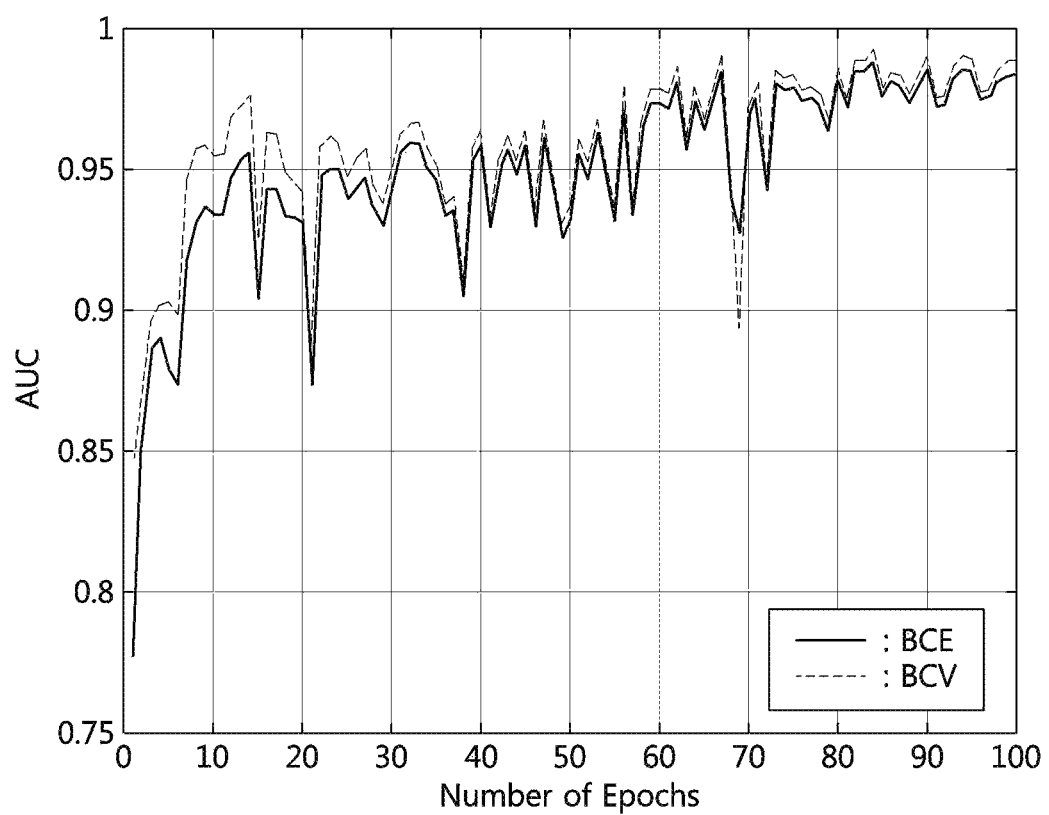

FIGS. 16 to 18 are graphs showing experimental results of the method and the apparatus for detecting abnormal traffic based on the CAE according to one embodiment of the present invention. As a condition for an experiment, about 660,000 pieces of data determined as normal requests among pieces of data determined by WAPPLE as an attack in the second and third quarter of 2014 were used as learning data for normal traffic. The CAE learns the learning data, which is used here, as comparison learning data for the CAE according to one embodiment of the present invention.

Further, about 210,000 pieces of data in the second and third quarter of 2014 which were not used for learning were used as data for target traffic. Here, the target traffic includes about 165,000 normal traffic and 48,000 or more abnormal traffic.

For each request message, an abnormal traffic detection result for data converted into an image was analyzed. In this case, a coefficient $\alpha$ of the cost function is applied as 0, and a coefficient $\beta$ thereof is applied as 1.

Referring to FIG. 16, it can be confirmed that when the BCE and the BCV are used for normal data and anomalous data, a result graph is obtained by calculating an empirical cumulative distribution function (CDF) for a mean and a standard deviation (STD).

Referring to FIG. 17, it can be confirmed that when learning of all data samples once is 1 epoch, as the number of epochs is accumulated, a false positive rate (FPR) decreases. In this case, a true positive rate (TPR) is 0.99.

Referring to FIG. 18, it can be confirmed that a graph shows area under curve (AUC) performance according to the learning of all the data samples for each of the BCE and the BCV. It can be confirmed that as the number of learning data increases, detection performance is improved.

The methods according to the present invention may be implemented in the form of a program command which is executable through various computer means and which is recorded in a computer-readable medium. The computer-readable medium may include program instructions, data files, data structures, and the like alone or in a combination thereof. The program instructions recorded in the computer-readable medium may be specially designed and configured for the present invention or may be available to those skilled in the computer software.

Examples of the computer-readable medium may include specially configured hardware, such as a ROM, a RAM, a flash memory, and the like, for storing and performing program instructions. Examples of the program instructions may include machine language codes generated by a compiler, as well as high-level language codes which are executable by a computer using an interpreter or the like. The above-described hardware may be configured to operate as at least one software module so as to perform an operation of the present invention, and vice versa.

Further, the above-described method or apparatus may be implemented by combining all or a part of the structure and the functions or may be implemented by separating the structure from the functions.

As described above, when the method and the apparatus for detecting abnormal traffic based on a CAE are used according to the present invention, it is possible to accurately detect abnormal traffic by reflecting dispersion and an entropy characteristic of the abnormal traffic.

Further, character string-based traffic is analyzed by applying an image-based autoencoder such that abnormal traffic can be detected.

While the example embodiments of the present invention and their advantages have been described in detail, it should be understood that various changes, substitutions and alterations may be made herein without departing from the scope of the invention.

What is claimed is:

1. A method of detecting abnormal traffic based on a convolutional autoencoder (CAE), the method comprising:
    converting a character string of normal traffic into an image;
    learning the converted image using the CAE; and
    detecting abnormal traffic by inputting target traffic to the learned CAE,
    wherein the detecting of the abnormal traffic includes:
    converting the target traffic into an image; and
    evaluating binary cross entropy (BCE) or binary cross varentropy (BCV) on an output obtained by inputting the target traffic converted into the image into the learned CAE.

2. The method of claim 1, wherein the converting of the character string into the image includes:
    obtaining the normal traffic in a form of unicode transformation format (UTF)-8; and
    converting a character string of the obtained normal traffic into a hexadecimal number.

3. The method of claim 1, wherein the converting of the character string into the image includes:
    converting the character string of the normal traffic in a reverse order;
    converting characters constituting the converted character string in the reverse order into vectors; and
    converting the vector-converted character string into an image.

4. The method of claim 1, wherein the CAE is an autoencoder constituted based on Inception Resnet V2.

5. The method of claim 1, wherein the learning of the converted image using the CAE includes determining parameters of the CAE so as to minimize a cost function defined based on the BCE.

6. The method of claim 1, wherein, when the number of channels is K and a length of a sequence is L, the BCE is defined as the following Equation with respect to a target traffic $x_{kl}^{(n)}$ converted into the image and an output $\hat{x}_{kl}^{(n)}$:

$$BCE_n = -\frac{1}{KL}\sum_{k=0}^{K-1}\sum_{l=0}^{L-1}\left(x_{kl}^{(n)}\log\hat{x}_{kl}^{(n)} + (1-x_{kl}^{(n)})\log(1-\hat{x}_{kl}^{(n)})\right).$$

7. The method of claim 1, wherein, when the number of channels is K and a length of a sequence is L, the BCV is defined as the following equation with respect to the target traffic $x_{kl}^{(n)}$ converted into the image and an output $\hat{x}_{kl}^{(n)}$:

$$BCV_n = \frac{1}{KL}\sum_{k=0}^{K-1}\sum_{l=0}^{L-1}\left(-x_{kl}^{(n)}\log\hat{x}_{kl}^{(n)} - (1-x_{kl}^{(n)})\log(1-\hat{x}_{kl}^{(n)}) - BCE_n\right)^2.$$

8. The method of claim 1, wherein the learning of the converted image using the CAE include determining parameters of the CAE to minimize a cost function defined by linearly combining total BCE according to the BCE with total BCV according to the BCV.

9. The method of claim 8, wherein the cost function is defined as the following equation:

Cost function=β·totalBCE+α·totalBCV.

10. An apparatus for detecting abnormal traffic based on a convolutional autoencoder (CAE), the apparatus comprising:
    at least one processor; and
    a memory configured to store instructions which direct the at least one processor to perform at least one operation,
    wherein the at least one operation includes:
    converting a character string of normal traffic into an image;
    learning the converted image using the CAE; and
    detecting abnormal traffic by inputting target traffic to the learned CAE, and
    the detecting of the abnormal traffic includes:
    converting the target traffic into an image; and
    evaluating binary cross entropy (BCE) or binary cross varentropy (BCV) on an output obtained by inputting the target traffic converted into the image into the learned CAE.

11. The apparatus of claim 10, wherein the converting of the character string into the image includes:
    obtaining the normal traffic in a form of unicode transformation format (UTF)-8; and
    converting a character string of the obtained normal traffic into a hexadecimal number.

12. The apparatus of claim 10, wherein the converting of the character string into the image includes:
    converting the character string of the normal traffic in a reverse order;
    converting characters constituting the converted character string in the reverse order into vectors; and
    converting the vector-converted character string into an image.

13. The apparatus of claim 10, wherein the CAE is an autoencoder constituted based on Inception Resnet V2.

14. The apparatus of claim 10, wherein the learning of the converted image using the CAE includes determining parameters of the CAE so as to minimize a cost function defined based on the BCE.

15. The apparatus of claim 10, wherein, when the number of channels is K and a length of a sequence is L, the BCE is defined as the following Equation with respect to a target traffic $x_{kl}^{(n)}$ converted into the image and an output $\hat{x}_{kl}^{(n)}$:

$$BCE_n = -\frac{1}{KL}\sum_{k=0}^{K-1}\sum_{l=0}^{L-1}\left(x_{kl}^{(n)}\log\hat{x}_{kl}^{(n)} + (1-x_{kl}^{(n)})\log(1-\hat{x}_{kl}^{(n)})\right).$$

16. The apparatus of claim 10, wherein, when the number of channels is K and a length of a sequence is L, the BCV is defined as the following equation with respect to the target traffic $x_{kl}^{(n)}$ converted into the image and an output $\hat{x}_{kl}^{(n)}$:

$$BCV_n = \frac{1}{KL}\sum_{k=0}^{K-1}\sum_{l=0}^{L-1}\left(-x_{kl}^{(n)}\log\hat{x}_{kl}^{(n)} - (1-x_{kl}^{(n)})\log(1-\hat{x}_{kl}^{(n)}) - BCE_n\right)^2.$$

17. The apparatus of claim 10, wherein the learning of the converted image using the CAE includes determining parameters of the CAE to minimize a cost function defined by linearly combining total BCE according to the BCE with total BCV according to the BCV.

18. The apparatus of claim 17, wherein the cost function is defined by the following equation:

Cost function=β·totalBCE+α·totalBCV.

* * * * *